United States Patent
Anderson

(10) Patent No.: US 9,282,693 B2
(45) Date of Patent: Mar. 15, 2016

(54) DATA ENCODING WITH PLANTING ATTRIBUTES

(71) Applicant: Deere and Company, Moline, IL (US)

(72) Inventor: Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 46 days.

(21) Appl. No.: 14/105,761

(22) Filed: Dec. 13, 2013

(65) Prior Publication Data
US 2015/0163992 A1    Jun. 18, 2015

(51) Int. Cl.
*A01C 21/00* (2006.01)
*A01B 79/00* (2006.01)

(52) U.S. Cl.
CPC ............ *A01C 21/005* (2013.01); *A01B 79/005* (2013.01)

(58) Field of Classification Search
USPC .......................................................... 701/50
See application file for complete search history.

(56) References Cited

U.S. PATENT DOCUMENTS

| | | |
|---|---|---|
| 2,502,468 A | 4/1950 | Marihart |
| 2,514,405 A | 7/1950 | Marihart |
| 3,512,587 A | 5/1970 | Shader |
| 3,821,550 A | 6/1974 | Priest |
| 4,228,636 A | 10/1980 | Homburg |
| 4,527,241 A | 7/1985 | Sheehan et al. |
| 4,823,268 A | 4/1989 | Giles et al. |
| 4,883,965 A | 11/1989 | Bohman |
| 5,019,983 A | 5/1991 | Schutten et al. |
| 5,216,483 A | 6/1993 | Berthold et al. |
| 5,220,172 A | 6/1993 | Berthold et al. |
| 5,282,389 A | 2/1994 | Faivre et al. |
| 5,296,702 A | 3/1994 | Beck et al. |
| 5,486,915 A | 1/1996 | Jeffers et al. |
| 5,568,405 A | 10/1996 | Easton et al. |
| 5,684,476 A | 11/1997 | Anderson |
| 5,763,873 A | 6/1998 | Beck et al. |
| 5,789,741 A | 8/1998 | Kinter et al. |
| 5,793,035 A | 8/1998 | Beck et al. |
| 5,809,440 A | 9/1998 | Beck et al. |
| 5,941,917 A | 8/1999 | Barnes et al. |
| 5,995,894 A | 11/1999 | Wendte |
| 6,073,427 A | 6/2000 | Nichols |
| 6,119,442 A | 9/2000 | Hale |
| 6,178,253 B1 | 1/2001 | Hendrickson et al. |
| 6,285,930 B1 | 9/2001 | Dickson et al. |

(Continued)

FOREIGN PATENT DOCUMENTS

| DE | 102008043716 A | 5/2010 |
|---|---|---|
| DE | 102011078290 A | 1/2013 |

(Continued)

OTHER PUBLICATIONS

B.K. Gibson, C.D. Parker & F.R. Musser, Corn Stalk Penetration Resistance as a Predictor of Southwestern Corn Borer (*Lepidoptera: Crambidae*) Survival, MidSouth Entomologist, 2009, vol. 3, 7-17, Missippi, www.midsouthentomologist.org.msstate.edu.

(Continued)

*Primary Examiner* — Thomas Tarcza
*Assistant Examiner* — Alex C Dunn
(74) *Attorney, Agent, or Firm* — Rathe Lindenbaum LLP

(57) ABSTRACT

A controller controls a device to vary the at least one attribute for each of a plurality of individual plants so as to form a pattern of attributes that encodes data for later recovery.

21 Claims, 7 Drawing Sheets

(56) References Cited

U.S. PATENT DOCUMENTS

| | | |
|---|---|---|
| 6,460,260 B1 | 10/2002 | Alster |
| 6,475,081 B2 | 11/2002 | Coers et al. |
| 6,551,451 B2 | 4/2003 | Trung et al. |
| 6,584,390 B2 | 6/2003 | Beck |
| 6,592,453 B2 | 7/2003 | Coers et al. |
| 6,668,223 B2 | 12/2003 | Blackmore et al. |
| 6,738,148 B2 | 5/2004 | Dunne et al. |
| 6,806,955 B2 | 10/2004 | Jang |
| 6,839,127 B1 | 1/2005 | Anderson |
| 6,874,304 B2 | 4/2005 | Clauss |
| 6,934,615 B2 * | 8/2005 | Flann et al. .................. 701/50 |
| 6,951,514 B1 | 10/2005 | Coers et al. |
| 6,990,459 B2 | 1/2006 | Schneider |
| 6,999,877 B1 | 2/2006 | Dyer et al. |
| 7,047,133 B1 | 5/2006 | Dyer et al. |
| 7,047,135 B2 | 5/2006 | Dyer et al. |
| 7,048,627 B2 | 5/2006 | Fechner et al. |
| 7,064,810 B2 | 6/2006 | Anderson et al. |
| 7,142,956 B2 * | 11/2006 | Heiniger et al. ............. 701/23 |
| 7,169,040 B2 | 1/2007 | Kormann et al. |
| 7,184,892 B1 | 2/2007 | Dyer et al. |
| 7,188,450 B2 | 3/2007 | Raun et al. |
| 7,206,063 B2 | 4/2007 | Anderson et al. |
| 7,216,033 B2 * | 5/2007 | Flann et al. .................. 701/533 |
| 7,228,214 B2 | 6/2007 | Flann et al. |
| 7,373,231 B2 * | 5/2008 | McClure et al. ............. 701/50 |
| 7,401,528 B2 | 7/2008 | Deppermann et al. |
| 7,412,880 B2 | 8/2008 | Barreiro et al. |
| 7,430,845 B2 | 10/2008 | Kormann et al. |
| 7,520,117 B2 | 4/2009 | Rieck et al. |
| 7,570,783 B2 | 8/2009 | Wei et al. |
| 7,584,663 B2 | 9/2009 | Missotten et al. |
| 7,604,712 B2 | 10/2009 | Trung et al. |
| 7,694,500 B2 | 4/2010 | Arnold et al. |
| 7,702,462 B2 | 4/2010 | Fuessley et al. |
| 7,716,905 B2 | 5/2010 | Wilcox et al. |
| 7,725,233 B2 | 5/2010 | Hendrickson et al. |
| 7,761,334 B2 | 7/2010 | Pickett et al. |
| 7,805,917 B2 | 10/2010 | Kempf et al. |
| 7,812,947 B2 | 10/2010 | Shakespeare et al. |
| 7,861,606 B2 | 1/2011 | Kormann |
| 7,916,898 B2 | 3/2011 | Anderson |
| 7,921,626 B2 | 4/2011 | Maertens et al. |
| 7,987,735 B2 | 8/2011 | Mann, III et al. |
| 8,049,892 B2 | 11/2011 | Shakespeare et al. |
| 8,061,114 B2 | 11/2011 | Mossman et al. |
| 8,078,367 B2 | 12/2011 | Sauder et al. |
| 8,190,337 B2 * | 5/2012 | McClure et al. ............. 701/50 |
| 8,214,111 B2 * | 7/2012 | Heiniger et al. ............. 701/50 |
| 8,594,897 B2 * | 11/2013 | Motavalli et al. ............. 701/50 |
| 8,875,641 B2 | 11/2014 | Zielke et al. |
| 8,914,198 B2 * | 12/2014 | Prickel et al. ................ 701/50 |
| 2002/0117274 A1 | 8/2002 | Jang |
| 2006/0196158 A1 | 9/2006 | Faivre et al. |
| 2006/0196622 A1 | 9/2006 | Trung et al. |
| 2006/0200334 A1 | 9/2006 | Faivre et al. |
| 2007/0239472 A1 | 10/2007 | Anderson |
| 2007/0288167 A1 | 12/2007 | Anderson et al. |
| 2007/0294994 A1 | 12/2007 | Deppermann et al. |
| 2010/0089176 A1 | 4/2010 | Mann, III et al. |
| 2010/0089178 A1 | 4/2010 | Tragesser et al. |
| 2010/0263275 A1 * | 10/2010 | Anderson .................. 47/58.1 R |
| 2010/0268679 A1 | 10/2010 | Anderson |
| 2011/0011048 A1 | 1/2011 | Hoffman |
| 2011/0153136 A1 | 6/2011 | Anderson |
| 2012/0029732 A1 | 2/2012 | Meyer |
| 2012/0029761 A1 | 2/2012 | Anderson |
| 2012/0046837 A1 * | 2/2012 | Anderson ...................... 701/50 |
| 2012/0050023 A1 | 3/2012 | Sauder et al. |
| 2012/0083907 A1 * | 4/2012 | Motavalli et al. ............. 700/90 |
| 2012/0113225 A1 | 5/2012 | Deppermann et al. |
| 2012/0185139 A1 * | 7/2012 | Prickel et al. ................ 701/50 |
| 2013/0152836 A1 | 6/2013 | Deppermann et al. |
| 2013/0184944 A1 | 7/2013 | Missotten et al. |
| 2013/0192134 A1 | 8/2013 | Deppermann et al. |
| 2013/0205733 A1 | 8/2013 | Peters et al. |

FOREIGN PATENT DOCUMENTS

| | | |
|---|---|---|
| EP | 2517549 A | 10/2012 |
| WO | 2011031414 A | 3/2011 |
| WO | 2011063814 A | 6/2011 |
| WO | 2012142395 A | 10/2012 |
| WO | 2013078328 A | 5/2013 |

OTHER PUBLICATIONS

Croplan, Stalk Quality, Corn Expertise, 2010, 3 pages, http://www.croplangenetics.com/FINDSEED/CORN/ECMD014194.aspx.

D.D. Bochtis, C.G. Sorensen, & O. Green, Soil Compaction Reduction System (Socresy Report) Presentation, University of Aarhus, Faculty of Agricultural Sciences, Department of Biosystems Engineering, May 18, 2011, 17 pages, Denmark.

D.D. Bochtis, C.G. Sorensen, & O. Green, Soil Compaction Reduction System (Socresy Report), University of Aarhus, Faculty of Agricultural Sciences, Department of Biosystems Engineering, May 18, 2011, 17 pages, Denmark.

Dirk Vandenhirtz, High throughput plant phenotyping for the development of better plants for the future, LemnaTec Presentation from Oct. 27, 2010, 102 pages.

Duli Zhao, K. Raja Reddy, V. Gopal Kakani, John J. Read & Sailaja Koti, Canopy reflectance in cotton for growth assessment and lint yield prediction, ScienceDirect, Dec. 19, 2006, (26) 335-344, European Journal of Agronomy.

James C. Frisby & Donald L. Pfost, Soil Compaction: The Silent Theif, University of Missouri Extension, Department of Agricultural Engineering, Oct. 1993, 4 pages, http://extension.missouri.edu/p/G1630.

Jonathan P. Kelly, By-plant prediction of corn (Zea mays L.) grain yield using height and stalk diameter, ProQuest, Dec. 2011, 2 pages, Oklahoma State University, http://proquest.umi.com/pqdlink?did=2401960911&Fmt=7&clientId=79356&RQT=309&Name=PQD.

Lei Zhang & Tony E. Grift, A monocular vision-based diameter sensor for Miscanthus giganteus, ScienceDirect, Jan. 21, 2012, 298-304, Illinois, www.elsevier.com/locate/issn/15375110.

MDL Laser Systems, LaserAce HypsoMeter Simple "All in One" Heighting, Diameter & Log Volume Instrument with Data Storage, 02 May 22, 2006, Western Data Systems, Inc., www.laserace.com.

Peter Tittmann, Sohail Shafii, Bruce Hartsough, Bernd Hamann, Tree Detection and Delineation from LiDAR point clouds using RANSAC, SilviLaser, Oct. 16-19, 2011, Department of Geography, UCD, 23 pages.

Salas, Ene, Gregoire, Naesset & Gobakken, Modelling tree diameter from airborne laser scanning derived variables: A comparison of spatial statistical models, Elsevier Ltd., 2010, 5 pages, http://pubget.com/paper/pgtmp_8001e8721eb6c97b19ea68023001f58e/Modelling_tree_diameter_from_airborne_laser_scanning_derived_variables_A_comparison_of_spatial_statistical_models.

Sorin C. Popescu, Randolph H. Wynne & Ross F. Nelson, Measuring Individual Tree Crown Diameter With Lidar and Assessing Its Influence on Estimating Forest Volume and Biomass, Canadian Journal of Remote Sensing, vol. 29, No. 5, 564-577, 2003.

Steve Watson, Drought-stressed corn needs timely harvest to avoid stalk lodging, CNHI, www.farmtalknewspaper.com, Sep. 7, 2011, 2 pages,, http://farmtalknewspaper.com/crops/x1642542647/Drought-stressed-corn-needs-timely-harvest-to-avoid-stalk-lodging.

Thomas Hellstrom, Peter Hohnloser, Ola Ringdahl, Tree Diameter Estimation Using Laser Scanner, Department of Computing Science Umea University, Dec. 20, 2012, 15 pages, Umea Sweden.

University of Kentucky, Producers Should Check Corn's Stalk Strength Before Harvest, Crop Management, University of Kentucky Press Release, 1 page, Sep. 21, 2009, http://www.plantmanagementnetwork.org/pub/cm/news/2009/StalkStrength/.

University of Wisconsin Madison, Precision Agriculture Precision Modeling, 2003, 2 pages, Madison, Wisconsin, http://www.soils.wisc.edu/~norman/RESAC/agric/modeling.html.

Unknown, Improved System and Method for Controlling Agricultural Vehicle Operation Using Historical Data, unknown, 7 pages.

* cited by examiner

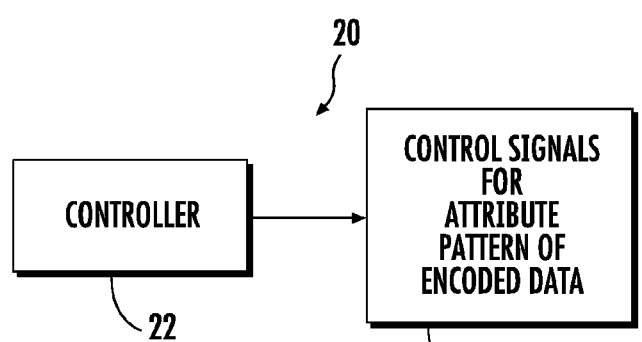
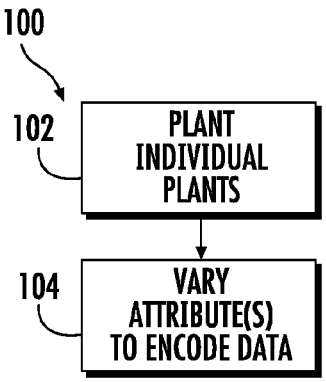
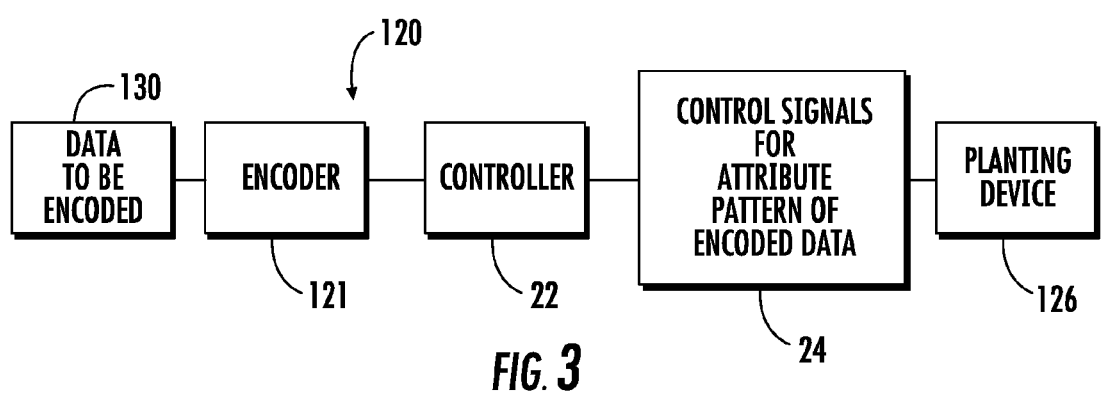
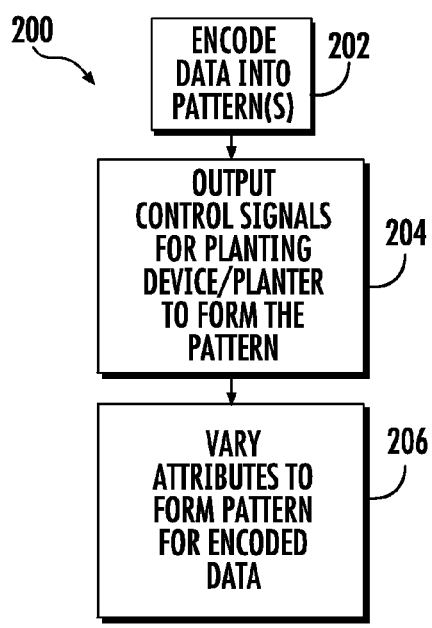
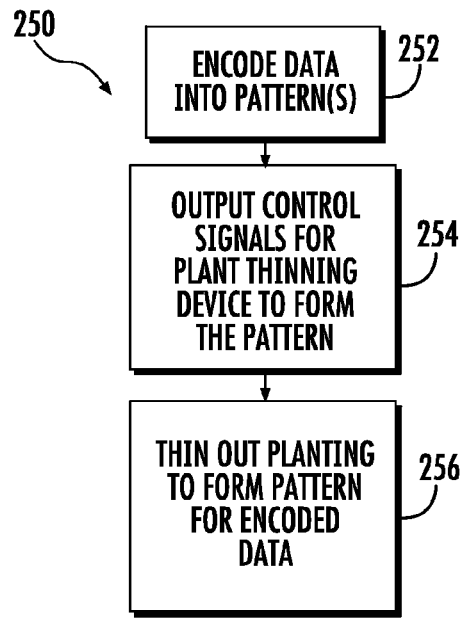

*FIG. 5*

| ROW | CLOCK | VALUE |
|---|---|---|
| 1 | ———————n———————— | ∅ |
| 2 | ———————LP——————— | ∅ |
| 3 | ———————TP——————— | 1 |

| ROW | | VALUE |
|---|---|---|
| 1 | ———RSP——————— | ∅ |
| 2 | ———LSP——————— | 1 |

| ROW | | | VALUE |
|---|---|---|---|
| 1 | 344 | GP | ∅ |
| 2 | 346 | P.P. | 1 |

| | | | | |
|---|---|---|---|---|
| ROW 1 | n | n | n | n... |
| ROW 2 | 1 | 3 | 1 | 3... |
| ROW 3 | 2 | 2 | 3 | 2... |
| ROW 4 | 3 | 1 | 0 | 1... |
| ROW 5 | 3 | 3 | 0 | 1... |
| ROW 6 | n | n | n | n... |
| ROW 7 | 1 | 0 | 0 | 2... |
| ROW 8 | 0 | 1 | 0 | 2... |

| PLANT ATTRIBUTES | VALUE |
|---|---|
| LP,PP | 0 |
| TP,PP | 1 |
| LP,GP | 2 |
| TP,GP | 3 | msn=most significant nibble, lsn=least significant nibble, ed=error detection (parity)

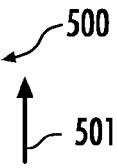

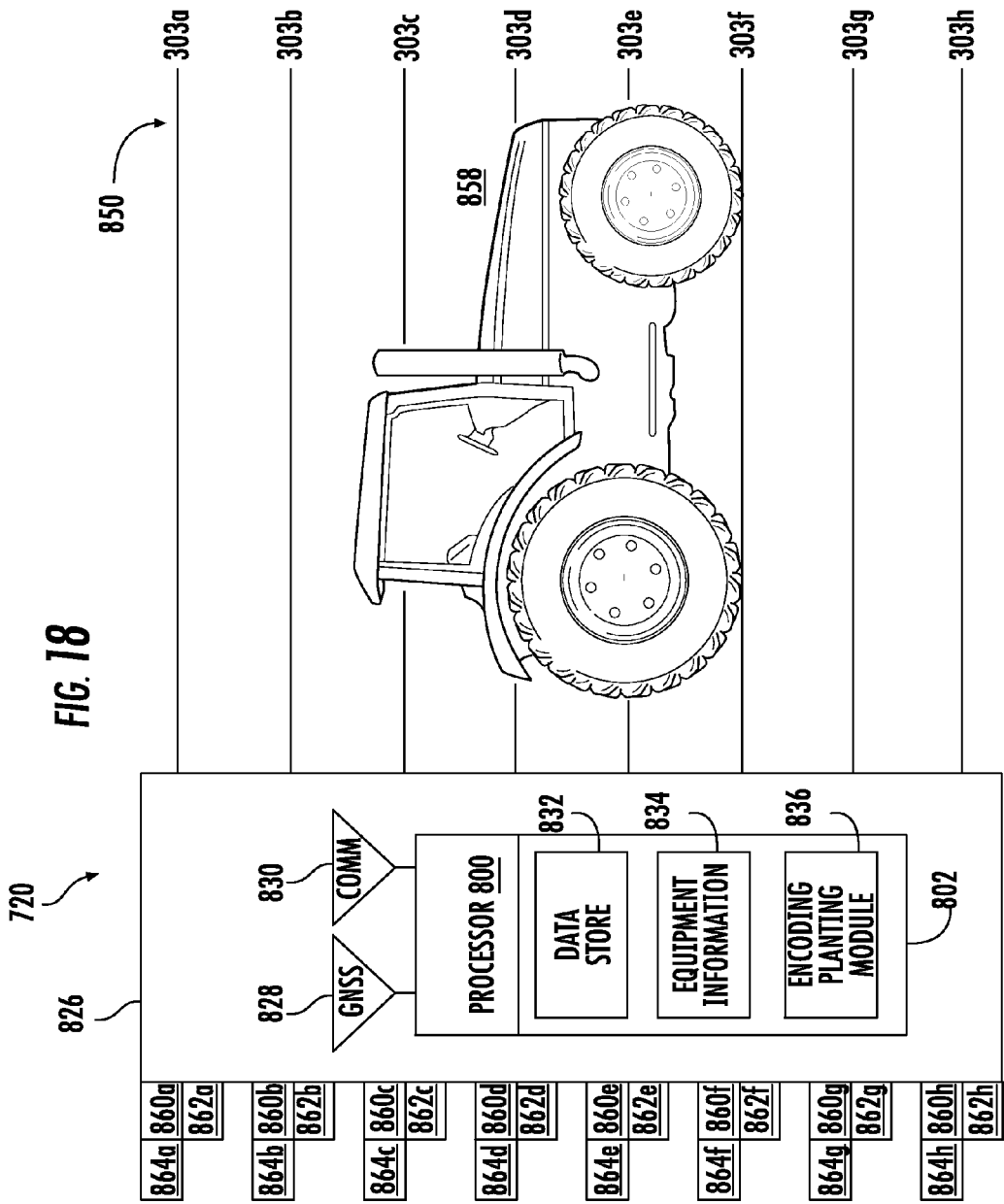

DATA ENCODING WITH PLANTING ATTRIBUTES

CROSS-REFERENCE TO RELATED PATENT APPLICATIONS

The present application is related to co-pending U.S. patent application Ser. No. 13/771,682 filed on Feb. 20, 2013 and entitled CROP SENSING, the full disclosure of which is hereby incorporated by reference. The present application is related to co-pending U.S. patent application Ser. No. 13/771,760 filed on Feb. 20, 2013 and entitled CROP SENSING DISPLAY, the full disclosure of which is hereby incorporated by reference. The present application is related to co-pending U.S. patent application Ser. No. 13/771,727 filed on Feb. 20, 2013 and entitled PER PLANT CROP SENSING RESOLUTION, the full disclosure of which is hereby incorporated by reference.

BACKGROUND

Real time kinematic global positioning systems or global navigation satellite systems are sometimes utilized for geo-referencing of crop information. Such geo-referencing lacks high resolution and may have issues with respect to cost, availability, crop canopies and terrain.

BRIEF DESCRIPTION OF THE DRAWINGS

FIG. 1 is a schematic diagram of an example data encoding system.

FIG. 2 is a flow diagram of an example method that may be carried out by the example data encoding system of FIG. 1.

FIG. 3 is a schematic diagram of another example data encoding system.

FIG. 4 is a flow diagram of an example data encoding method that may be carried out by the example data encoding system of FIG. 3.

FIG. 4A is a flow diagram of another example data encoding method.

FIG. 5 is a diagram of an example field with a first example of plant position encoded data.

FIG. 6 is a diagram of an example field with a second example of plant position coded data.

FIG. 7 is a diagram of an example field with an example of plant characteristic encoded data.

FIG. 8 is a diagram of an example field with data encoded based upon plant position and a plant characteristic.

FIG. 9 is a diagram of an example memory storing portions of an example encoding scheme for the field of FIG. 8.

FIG. 14 is a diagram of an example field having a fifth example encoding scheme.

FIG. 15 is a diagram of an example memory storing portions of an example encoding scheme.

FIG. 16 is a diagram of an example field having a sixth example encoding scheme.

FIG. 17 is a diagram of an example field having the seventh example encoding scheme.

FIG. 18 is a schematic diagram of another example data encoding system in an example field.

DETAILED DESCRIPTION OF THE EXAMPLE EMBODIMENTS

Figure 10:
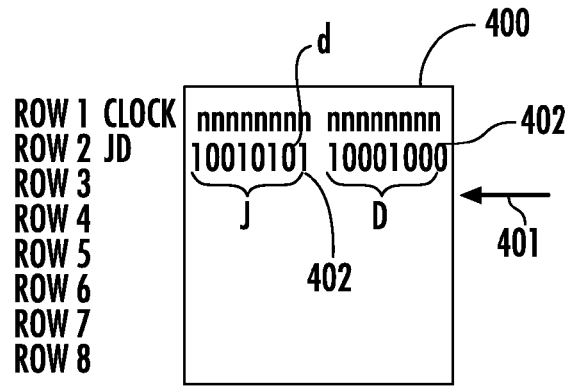
FIG. 10 is a diagram of an example field having a first example encoding scheme.

FIG. 1 schematically illustrates an example data encoding system 20. Data encoding system 20 encodes data by intentionally varying planting attributes of individual plants to form a pattern in a field that encodes the data. In an example embodiment, the term "plant" refers to seeds, germinated seeds, plugs and other planting stock. The term "planting" refers to the placing of a plant in the ground or growing medium for the first time or as a transplant. In an example embodiment, the term "field" refers to any growing region in which plants are located in growing including, but not limited to, row crop fields and orchards. As will be described hereafter, data encoding system 20 facilitates phyto-referencing with respect to individual plants utilizing the encoded data. Data encoding system 20 offers high-resolution phyto-referencing of data for more accurate correlation of plant health and yield factors as compared to geo-referencing. Data encoding system 20 offers high resolution crop referencing with wide availability and at a low cost.

As shown by FIG. 1, data encoding system 20 comprises controller 22. Controller 22 comprises one or more processing units configured to generate control signals 24 to control a planting device to vary at least one attribute for each of a plurality of individual plants so as to form a pattern of attributes that encodes data. In an example embodiment, the term "attribute" refers to a quality, characteristic or property of an individual plant. Examples of plant attribute include, but are not limited to: the presence of a plant; the geographic location of a plant in a field; the location of the plant relative to other plants, a plant row, a determined index location, landforms or boundaries; one or more color characteristics of the plant; variety characteristics of the plant; plant height; stalk width; plant shape and the like. The formed pattern of attributes is subsequently sensed and decoded to recover the data.

In an example, the term "processing unit" means a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 22 may be embodied as part of one or more application-specific integrated circuits (ASICs). Unless otherwise specifically noted, the controller is not limited to any specific combination of hardware circuitry and software, nor to any particular source for the instructions executed by the processing unit.

FIG. 2 is a flow diagram of an example method 100 that may be carried out by the data encoding system 20 of FIG. 1. As indicated by step 102, individual plants are planted/transplanted. In one implementation, the plants are planted as seeds. In another implementation, the plants are planted following germination or as plugs. Examples of plants include, but are not limited to, trees, row crops, vegetables and the like. Such planting may be achieved mechanically, such as with a mechanical planting device operating under the control of controller 22, or manually. In cases where plants are manually planted, the planting device receiving signals from controller 22 instructs the person carrying out the manual planting as to how to vary the attributes of the plants being planted.

As indicated by step 104, attributes of the individual plants are varied to form a pattern that encodes data. Examples of individual attributes that are varied by controller 22 comprise plant presence attributes, plant location attributes, plant characteristic attributes, and the like. In an example embodiment, a plant presence attribute refers to the existence or presence of the plant in a series or sequence of plants. In such an implementation, controller 22 varies planting attributes by controlling whether or not a plant is actually planted at a predetermined location or whether an opening is provided in a series of plants.

In an example embodiment, plant location attributes refers to the location in which the individual plant is planted or supported with respect to a predetermined or index location. In one implementation, different plants may have different lateral locations relative to a predetermined lateral index location. For example, one plant may be positioned to the left of a row center while another plant is positioned to the right of a row center. In one implementation, different plants may have different longitudinal locations relative to a predetermined longitudinal index location. For example, one plant may be positioned forward of a predefined row location while another plant is positioned rearward of a predefined row location.

In an example embodiment, a plant characteristic attribute refers to characteristics of the plant itself, apart from its presence or its location. Examples of plant characteristics comprise the color of the plant, a species of the plant, a variety of the plant, a height of the plant, a shape of the plant and the like. For example, some varieties of corn, also known as *Zea mays*, produce significant amounts of sugar/pigment anthocyanin which give the plants a purplish color. By varying the variety of such planted corn plants, controller 22 may vary the color of the corn plant to form a color pattern so as to encode data.

In one implementation, control signals 24 output by controller 22 control and direct a mechanical planting device to vary the planting attributes of the individual plants to encode data. For example, in one implementation, such control signals 24 control the mechanical planting device to vary whether or not a seed or plant is planted (plant presence attribute), to vary the location of a to be planted plant, before or after germination, by controlling movement of a plant depositing structure or by controlling the time at which a to be planted plant is released by plant depositing mechanism (plant location attribute) or by varying what particular type, variety or species of plant is withdrawn from inventory by a plant depositing mechanism for planting (plant characteristic attribute).

In other implementations in which plants are manually planted, control signals 24 may signal to a person manually planting the plants as to whether or not a seed or plant is to be planted (plant presence attribute), as to how the location of a to be planted plant should be varied (plant location attribute) or as to what particular type, variety or species of plant should be withdrawn from inventory and planted at a particular time (plant characteristic attribute). For example, control signals 24 may cause a display, audible device and/or light emitting device to output a signal instructing a person as to what plant he or she should grab for planting, as to where the plant should be planted and/or as to whether or not a plant should be planted or a whether a planting space be left empty.

FIG. 3 schematically illustrates data encoding system 120, a particular example of data encoding system 20. Data encoding system 120 comprises encoder 121, controller 22, and planting device 126. Encoder 121 comprises one or more processing units that receives data 130 to be encoded and determines a codification of such data. In one implementation, data 130 comprises a rank or ordered position of an individual plant in a sequence of parallel planted rows of plants. The rank of the individual plant which is encoded facilitates phyto-referencing of individual plants, distinguishing one plant in a row from another plant in the row and associating data with the individual plant. In one implementation, data 130 additionally or alternatively comprises supplemental data such as the name of the field in which the plant resides, the crop year, an identification of the pass across the field by a planter, an identification of the row in which the plant is located, an identification of a boundary of a region or area and/or a machine adjustment trigger. In one implementation, the boundary of a region or area comprises the boundary of the field, the boundary of a head land or end row, and/or the boundary of a distinct region of field having a distinct soil or growing characteristic, such as a low lying part of the field which is a wet spot or a portion of the field having sandy soil characteristics. In one implementation, the machine adjustment trigger comprises data in the form of a command or control line that triggers generation of control signals that adjust operation of the machine. For example, in one implementation, data 130 comprises a command causing an applicator to cease or adjust application of a certain type of chemical, herbicide, insecticide or fertilizer for a particular plant, group of plants or a certain portion of a field. In another implementation, data 130 comprises a command causing the operation of a combine harvester to be adjusted to accommodate a change in plant characteristics during harvesting or to accommodate changes in field location, such as when an end row is reached.

In one implementation, data 130 is stored at a location remote from encoder 121 and is transmitted to encoder 121. In another implementation, data 130 is stored locally with respect to encoder 121. In yet other implementations, data 130, such as the rank of an individual plant, is sensed and established in real time during planting.

Encoder 121 applies a codification scheme to the data. In one implementation, encoder 121 utilizes a binary or base two encoding scheme for encoding data 130. In one implementation, two alternatives of a planting attribute are utilized to form a pattern encoding data 130. In other implementations, encoder 121 utilizes an encoding scheme having an encoding base greater than two. In such an implementation, two alternatives for each of multiple planting attributes are utilized to form a pattern encoding data 130. Encoder 121 stores the codification scheme and the data represented by such codes in a local or remote memory for subsequent use in decoding the pattern of planting attributes to ascertain the underlying data.

Controller 22 (described above) utilizes the encoded data from encoder 121 to generate control signals 24 for varying the attributes to form a pattern of encoded data. In one implementation, controller 22 is local to encoder 121. In yet another implementation, controller 22 remotely resides with respect to encoder 121. For example, in one implementation, encoder 121 resides at a first location, such as on a computer at an enterprise back-office, while controller 22 resides on a vehicle or on mechanical planting device (such as on a planter). Such computation by encoder 121 and/or controller 22 may be done entirely on a machine in real time or may be distributed across space and time utilizing multiple processors, wired and wireless data transfer and the like. Controller 22 transmits or outputs the control signals to planting device 126.

Planting device 126 comprises a device to physically position a plant in the ground or other growing medium or to output instructions to a person for manual placement of a plant in the ground or other growing medium. Planting device 126 is configured to selectively vary at least one attribute of an individual plant in response to control signals 24 from controller 22 so as to form a pattern to encode the data 130. In one implementation, planting device 126 comprises a planter with row units having electric drives which vary the timing of seed singulation and/or seed placement. In another implementation, planting device 126 comprises a device configured to plant a tape or rope upon which seed is carried, wherein self-clocked data is used to vary seed spacing on the tape or rope and/or vary tape speed to vary seed placement to encode data. In another implementation, multiple alternative routes of different lengths are provided between a seed singulation meter and ground, wherein the particular route in which the seed is placed and travels is controlled by an actuatable gate controlled by control signals 24. In one implementation, planting device 126 comprises a gate that is activated with a mechanical binary counter which increments each rank with a wheel driven diameter. In such an application, a separate counter is employed for pass number and is incremented each time the planter is lowered into the ground. In yet another implementation in which planter manually planted, planting device 126 may signal people in each row with a light, sound or vibration as to the exact moment or location for planting itself to form the pattern encoding data 130.

FIG. 4 is a flow diagram of an example method 200 for encoding data that may be carried out by encoding system 120 of FIG. 3. As indicated by step 202, encoder 121 encodes data 130 into one or more patterns according to a selected encoding scheme. As indicated by step 204, such patterns are transmitted to controller 22 which utilizes such patterns to generate control signals 24 for planting device 126 to form the patterns. As indicated by step 206, planting device 126 receives such control signals and varies the planting attributes of the individual plants such that data 130 is encoded in the varying attributes of the planted plants.

FIG. 4A is a flow diagram illustrating another example method 250 for encoding data by varying planting attributes of plants. Method 250 is configured to be carried out by encoding system 120 with replacement of planting device 126 with a plant thinning device. Instead of varying or controlling the location of variety of the plant as it is being planted to form a pattern representing the encoded data, method 250 removes or thins out individual plants to form the pattern representing the encoded data. As indicated by step 252, encoder 121 encodes data 130 into one or more patterns according to a selected encoding scheme. As indicated by step 254, such patterns are transmitted to controller 22 which utilizes such patterns to generate control signals for a plant thinning device or manual plant thinning persons to remove plants so as to form the patterns. As indicated by step 256, the plant thinning device or persons receives such control signals and varies the planting attributes of the individual plants by selectively thinning or removing individual plants such that data 130 is encoded in the varying planting attributes of the planted plants.

FIGS. 5-7 are diagrams of portions of example fields in which attributes of individual plants are varied to assign individual plants different encoding scheme values, such as 0 and 1 in a binary encoding scheme. FIG. 5 illustrates varying a plant location attribute such that different plants have different encoding scheme values depending upon the planted location of a plant. FIG. 5 specifically illustrates an example method which involves varying a longitudinal location of an individual plant along a row relative to a predetermined longitudinal index location. FIG. 5 illustrates a portion of an example field 300 having three example field rows, 1, 2, 3. Row 1 comprises a "clock row" having a clock plant n planted at a predetermined longitudinal location along a longitudinal axis or row centerline 302. The location of clock plant n serves as a longitudinal index location against which the location of plants in rows 2 and 3 are compared to determine their encoding scheme value.

In some implementations, field 300 may be provided with multiple redundant clock rows having clock plants n. Providing redundant clock rows increases encoding reliability by increasing the likelihood that at least one clock plant for each rank, plants will be present for comparison in circumstances where a clock plant may fail to germinate, may die, may be washed away, may be eaten, may be flattened/down or may otherwise be subsequently incapable of being identified or sensed.

Rows 2 and 3 include plants 304 and 306, respectively. Plant 304 comprises a leading plant LP planted in front of or forward of clock plant n. Plant 306 comprises a trailing plant TP planted behind or rearward of clock plant n. In the example encoding scheme illustrated, leading plants LP have encoding scheme value of zero and trailing plants TP have encoding scheme value of one. If the encoded data pattern assigns an individual plant with a value of zero, controller 22 generates control signals 24 causing the individual plant to be planted in front of clock plant n. Likewise, if the encoded data pattern assigns an individual plant with a value of one, controller 22 generates control signals 24 causing the individual plant to be behind the clock plant n. In other implementations, encoding scheme may be utilized in which a trailing plant represents a value of zero while a leading plant represents a value of one. In some implementations clock plant n may be omitted, wherein the longitudinal index value is deemed to be at a predetermined spacing or position.

FIG. 6 illustrates another example method for varying a plant location attribute such that different plants have different encoding scheme values depending upon the planted location of a plant. FIG. 5 specifically illustrates an example method which involves varying a lateral or transverse location of an individual plant along a row relative to a predetermined lateral index location. FIG. 6 illustrates a portion of an example field 320 having two example field rows, 1, 2. Rows 1 and 2 include plants 324 and 326, respectively. Plant 324 comprises a right side plant RSP planted on a right side of the centerline 322 of row 1. Plant 326 comprises a left side plant LSP planted on the left side of the centerline 322 of row 2. In the example encoding scheme illustrated, right side plants RSP have encoding scheme value of zero and left side plants LSP have an encoding scheme value of one. If the encoded data pattern assigns an individual plant with a value of zero, controller 22 generates control signals 24 causing the individual plant to be planted to the right of the row centerline.

Likewise, if the encoded data pattern assigns an individual plant with a value of one, controller generates control signals 24 causing the individual plant to be planted to the left of the row centerline. In other implementations, encoding schemes may be utilized in which a left side plant represents a value of zero while a right side plant represents a value of one.

In the example illustrated in FIG. 6, the centerline 322 of each row serves as a predetermined lateral index location for comparison to determine the encoding scheme values of the plants in the row. In other implementations, other predetermined lateral index locations may be utilized. For example, in another implementation, field 320 is provided with an additional clock row having clock plants n, wherein the lateral positioning of the clock plants n serve as the predetermined lateral index location and wherein the value of a particular plant in other rows is determined based upon the particular plant lateral distance from the corresponding clock plant n. In some implementations, a base three encoding scheme may be employed in which an individual plant is assigned a value of zero, one or two depending upon whether the plant is planted on the centerline 322, to the right of the centerline 322 or to the left of the centerline 322. In some implementations, the determination of whether a plant has been assigned a particular encoding scheme value is determined based upon whether the plant is planted within a predefined range of lateral distances or spacings from the lateral index location. In some implementations, field 320 is provided with a clock row of clock plants n, wherein the clock plants n do not serve as index locations, but only serve as triggers for indicating when plants in other rows are to be sensed.

FIG. 7 illustrates varying a plant characteristic attribute such that different plants have different encoding scheme values depending upon the plant characteristic of a plant. Examples of plant characteristics comprise the color of the plant, a species of the plant, a variety of the plant, a height of the plant, a shape of the plant and the like. FIG. 7 specifically illustrates an example method which involves varying a color/variety of an individual plant such that different plants have different encoding scheme values depending upon the color/variety of a plant. For example, some varieties of corn, *Zea mays*, produce significant amounts of sugar/pigment anthocyanin which give the plants a purplish color. By varying the variety of such planted corn plants, controller 22 may vary the color of the corn plant to form a color pattern of plants so as to encode data.

FIG. 7 illustrates a portion of an example field 340 having two example field rows, 1, 2. Rows 1 and 2 include plants 344 and 346, respectively. Although field 320 omits a clock row of clock plants n, in other implementations, field 340 is provided with clock plants n which serve as triggers for indicating when plants in other rows are to be sensed. In the example illustrated, plant 344 comprises a green plant GP while plant 346 comprises a purple plant PP. In the example encoding scheme illustrated, green plants GP have encoding scheme value of zero and purple plants PP have an encoding scheme value of one. If the encoded data pattern assigns an individual plant with a value of zero, controller 22 generates control signals 24 causing the individual plant to be of a first variety such that it will have a green color at the time that the color of the individual plant is sensed during subsequent decoding. Likewise, if the encoded data pattern assigns an individual plant with a value of one, controller generates control signals 24 causing the individual plant to be of a second variety such that it will have a purple color at the time that the color of the individual plant is sensed during subsequent decoding. In other implementations, encoding schemes may be utilized in which a purple plant represents a value of zero while a green plant represents a value of one. In other implementations, other plant characteristics are varied to assign encoding scheme values to individual plants.

FIGS. 8 and 9 illustrate use of a base four encoding scheme by concurrently varying both the plant location attribute and a plant characteristic attribute. In the illustrated example, individual plants are assigned a value of zero-to-three by varying longitudinal locations of the planted plants (as described above with respect to FIG. 5) and by also varying the color of the plant (as described above with respect to FIG. 7). FIG. 8 illustrates an example field 360 having redundant clock rows of clock plants n and remaining plants encoded with values according to the table shown in FIG. 9. As shown by FIG. 9, to assign a plant with a value of zero, the variety of the plant is selected so as to have purple color at the time of subsequent color sensing and is planted in front of the corresponding clock plant n. To assign a plant with a value of one, the variety of the plant is selected so as to have a purple color at the time of subsequent color sensing and is planted behind the corresponding clock plant n. To assign a plant with a value of two, the variety of the plant is selected so as to have green color at the time of subsequent color sensing and is planted in front of the corresponding clock plant n. To assign a plant with a value of three, the variety of the plant is selected so as to have a green color at the time of subsequent color sensing and is planted behind the corresponding clock plant n. In yet another implementation, field 360 is encoded using a base eight scheme in which individual plants are assigned values ranging from zero to seven by varying each of three planting attributes such as the longitudinal location of the plant (as described above with respect to FIG. 5), the lateral location of the plant (as described above with respect to FIG. 6) and the color or other characteristic of the plant (as described above with respect to FIG. 7). In still other implementations, other planting attributes may be varied to utilize other encoding schemes with an encoding base greater than two.

FIGS. 10-13 schematically illustrate portions of fields having planted plants with attributes that vary to form patterns to encode data in accordance with different encoding schemes. FIG. 10 illustrates two rows of planted plants in an example field 400 to encode data. In particular, FIG. 10 illustrates data that is encoded using a binary, base two, encoding scheme with a clock row of plants (n), data plants (d) and parity error detection plants 402. The clock row of plants n indicate when plants the remaining rows should be sensed during decoding. In one implementation, the location of each plant n in the clock row serves as a predetermined longitudinal index location against which offset positions (leading or trailing positions) of corresponding data plants (d) in rows 2-8 are compared to determine whether such data plants represent a zero or a one in the binary scheme.

Data plants d have assigned plant attributes forming a pattern representing encoded data. In the example illustrated, each data plant d is assigned a binary value of one or zero by varying or controlling the attributes of each individual plant. In the example illustrated, the attributes comprise a planting location attribute, wherein the binary value of each plant is controlled by varying its longitudinal location relative to the corresponding, same rank, clock row plant n. In the example illustrated, data is represented by a serial arrangement of data plants along each row. In the example illustrated, row 2 encodes both data elements of data JD: J represented by 1001010 and D represented by 1000100. In an example embodiment, a data "element" refers to a complete set of data plants that form a complete pattern or set of data bits according to an encoding scheme. In one implementation, a data element constitutes a byte (8 bits represented by 8 plants).

Parity error detection plants 302 each have an assigned plant attribute so as to have a value 0 when the associated number of data plants d having a value 1 is even and so as to have a value 1 when the associated number of data plants d having a value one is odd. In the example illustrated, the plant attribute that determines the binary value of the plant is a plant location attribute, wherein parity error detection plant 402 has a binary value of zero or one depending upon whether the plant 402 is trailing or leading with respect to the corresponding clock plant n. Parity error detection plant 402 may be used for error detection to determine whether one of the data plants d has been assigned an incorrect binary value.

Figure 11:
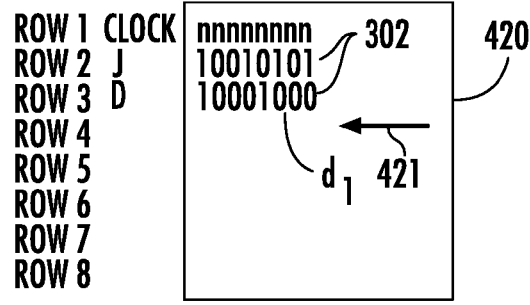
FIG. 11 is a diagram of another example field having a second example encoding scheme.

FIG. 11 illustrates three rows of planted plants in an example field 420 to encode data. As with FIG. 10, FIG. 11 illustrates data that is encoded using a binary, base two, encoding scheme with a clock row of plants (n), data plants (d) and parity error detection plants 402. The clock row of plants n indicate when plants in the remaining rows should be sensed during decoding. In one implementation, the location of each plant n in the clock row also serves as a predetermined longitudinal index location against which offset positions (leading or trailing positions) of corresponding data plants (d) in rows 2-8 are compared to determine whether such data plants represent a zero or a one in the binary scheme.

Data plants d of field 420 have assigned plant attributes forming a pattern representing encoded data. In the example illustrated, each data plant d is assigned a binary value of one or zero by varying or controlling the attributes of each individual plant. In the example illustrated, the attributes comprise a planting location attribute, wherein the binary value of each plant is controlled by varying its longitudinal location relative to the corresponding, same rank, clock row plant n. In the example illustrated, data is represented by a serial arrangement of data plants along dual rows. In the example illustrated, row 2 encodes a first element of data JD: J represented by 1001010. Corresponding ranks of row 3 encode a second element of data JD: D represented by 1000100.

As with parity error detection plants 402 of field 400, parity error detection plants 402 of field 420 are positioned relative to the corresponding clock plant n so as to have a value 0 when the number of data plants d having a value 1 for the piece of data is even and so as to have a value 1 when the number of data plants d having a value one is odd. As a result, parity error detection plants 402 may be used for error detection to determine whether one of the data plants d has been assigned an incorrect binary value. In the example illustrated, during subsequent decoding, the data JD may be ascertained by movement of a plant attribute sensing device, such as carried by insecticide, herbicide, fertilizer sprayer/applicator or a combine harvester, in the direction indicated by arrow 421 through a distance encompassing eight ranks. In contrast, the same data JD in field 400 requires movement by plant attribute sensing device, such as carried by insecticide, herbicide, fertilizer sprayer/applicator or a combine harvester, in the direction indicated by arrow 401 through a distance of 16 ranks of plants. As a result, the data is more quickly or more timely ascertained.

Figure 12:
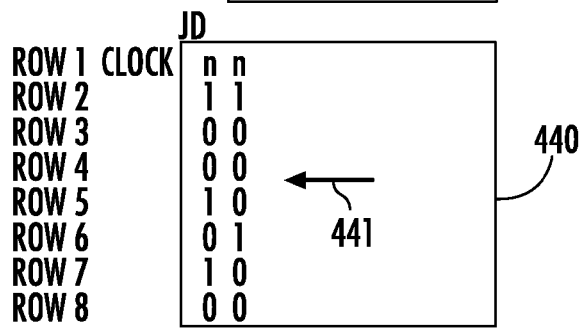
FIG. 12 is a diagram of another example field having a third example encoding scheme.

FIG. 12 illustrates two ranks of a rows of planted plants in an example field 440 to encode data. As with FIG. 10, FIG. 12 illustrates data that is encoded using a binary, base two, encoding scheme with a clock row of plants (n) (described above). Like data plants of field 420, data plants d of field 440 have assigned plant attributes forming a pattern representing encoded data. In the example illustrated, each data plant d is assigned a binary value of one or zero by varying or controlling the attributes of each individual plant. In the example illustrated, the planting attributes comprise a planting location attribute, wherein the binary value of each plant is controlled by varying its longitudinal location relative to the corresponding, same rank, clock row plant n. In the example illustrated, data is represented by a parallel arrangement of data plants along multiple rows. In the example illustrated, rank 1 of each of plant rows 2-8 encodes a first element of data JD: J represented by 1001010. Rank 2 of plant rows 2-8 encode a second element of data JD: D represented by 1000100. The parallel encoding scheme of data plants d facilitates subsequent concurrent sensing of an entire piece of data or substantial portion of a piece of data from plants located along multiple rows. In the example illustrated, during subsequent decoding, the data JD may be ascertained by movement of a plant attribute sensing device or perceiver, such as carried by such as carried by insecticide, herbicide, fertilizer sprayer/applicator or a combine harvester, in the direction indicated by arrow 441 through a distance encompassing two ranks. In contrast, the same two data values JD in fields 420 requires movement in the direction indicated by arrow 421 through a distance of eight ranks of plants. As a result, the data is more quickly or more timely ascertained.

Figure 13:
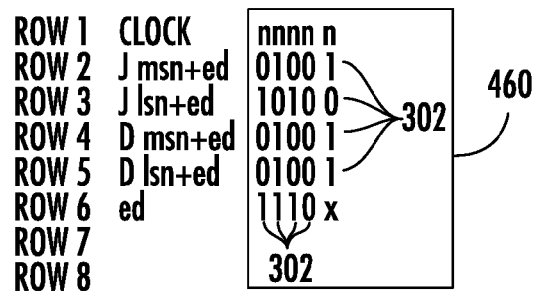
FIG. 13 is a diagram of another example field having a fourth example encoding scheme.

FIG. 13 illustrates six rows of planted plants in an example field 460 to encode data. As with FIG. 10, FIG. 13 illustrates data that is encoded using a binary, base two, encoding scheme with a clock row of plants (n) (described above), data plants (d) and parity error detection plants 302. Data plants d of field 460 have assigned plant attributes forming a pattern representing encoded data. In the example illustrated, each data plant d is assigned a binary value of one or zero by varying or controlling the attributes of each individual plant. In the example illustrated, the attributes comprise a planting location attribute, wherein the binary value of each plant is controlled by varying its longitudinal location relative to the corresponding, same rank, clock row plant n.

In the example illustrated, data is represented by a serial arrangement of data plants along multiple rows, wherein the set of data plants representing a single data element are spread across multiple rows. In the example illustrated, row 2 encodes a first portion or nibble of data element J, 0100 while row 3 encodes a second portion or nibble of data element J, 1010. In a similar fashion, row 4 encodes a first portion or nibble of data element D, 0100 while row 5 encodes a second portion or nibble of data element D, 0100.

As with parity error detection plants 402 of field 400, parity error detection plants 302 of field 460 are positioned relative to the corresponding clock plant n so as to have a value 0 when the number of associated data plants d having a value 1 for the piece of data is even and so as to have a value 1 when the number of associated data plants d having a value one is odd. As a result, parity error detection plants 302 may be used for error detection to determine whether one of the data plants d has been assigned an incorrect binary value.

In the example illustrated, rows 2-6 each include a data parity error detection plant 302 for each nibble or portion of a data value. In the example illustrated, each column of data plants d or each rank, ordered position for the set of rows 2-5, also includes a data parity error detection plant 302. As a result, the data encoding scheme of field 360 provides dual error detection along both rows and columns to facilitate identification of which specific individual data plant d has been assigned an incorrect binary value. Moreover, error detection reliability is enhanced in circumstances where one of the parity error detection plants 302 may not be present for subsequent sensing.

In each of the above described examples set forth in FIGS. 10-13, the encoding scheme is a binary, base two scheme. In other implementations, the coding schemes for fields 400-

460 may have an encoding scheme base greater than two. In each of the examples described above, the example data being encoded is JD with data values J and D encoded according to the American Standard Code for Information Interchange (ASCII) character encoding scheme. In such examples, the data JD is for mere exemplary purposes. In other implementations, other data in the form of characters or in the form of numbers, with a greater number or fewer number of data values may be encoded using the ASCII character encoding scheme or other standard or nonstandard custom encoding schemes. In one implementation, the data values may comprise numbers or characters corresponding to data 130 in a data table or lookup table. For example, a data value indicated by set of bits represented by a set of data plants, such as "576", may correspond to a particular plant attribute, field name, field pass number, field boundary, or machine command in a specialized or customized data table or lookup table.

FIG. 14 illustrates a portion of an example planted field 500 with individual plants having varying planting attributes representing encoded data. FIG. 14 illustrates an example data encoding scheme in which the rank, ordered position of each plant in each row of a field pass is codified. The example encoding scheme illustrating FIG. 14 comprises a binary, base two encoding scheme for use with a 16 row planting device or planter which moves in the direction 501 when moving across the field during planting. In the example illustrated, 12 of the 16 rows are utilized to encode the rank of each plant in each row of the field pass. In the example illustrated, the individual rank one plants across the rows of the pass are each assigned encoding scheme values such that the 12 plants in rank 1 represent the binary value for 1. The individual rank two plants in the pass are each assigned encoding scheme values such the 12 plants in rank 2 represent the binary value for 2. This continues for each rank of plants in the field pass. If a 16 row planter or planting device is utilized, the plants planted by the additional first four or last four rows (not shown) of the planter during each pass of the planter across the field may be assigned varying plant attributes to encode supplemental data such as a field name, crop year, field pass identification, row identification, boundary identification or machine adjustment trigger.

FIGS. 15-17 illustrate another example encoding scheme 602 that may be utilized by system 20 or system 120 for varying attributes to encode data using the planted plants. As shown by FIG. 15, in addition to encoding a rank identifier for each plant in a row of plants during a field pass of a planting machine, encoding system 120 additionally encodes eight different types of supplemental data: field identification having code 510, field pass identification number having code 512, seed variety identification having code 514, plant population having code 516, plant attribute having code 518, management zone boundary having code 520, a data type reserved for additional to be identified data types having code 522 and a miscellaneous data type having code 524. Such codes 510-524 are encoded using the planting attributes of the plants to indicate what type of data is presented by other plants in the rank across the TOWS.

FIG. 16 illustrates a portion of a first pass of a 16 row planting device or planter across an example field 600 with the example encoding scheme 602. Encoding scheme 602 comprises a parallel data with clock-no parity encoding scheme similar to the scheme described above with respect to FIG. 12. Data is encoded by varying planting attributes as a planting device moves across a field during a pass in the direction indicated by arrow 601. Encoding scheme 602 utilizes rows 604 for redundant clock plants C, rows 606A, 606B for redundant extra message indicator plants X and the remaining rows for data. Clock plants C are similar to clock plants n described above. In the example illustrated, the redundant clock plants C are physically separated to reduce a likelihood of a common mode loss of both rows.

Extra message indicator plants X comprise plants that have assigned planting attributes so as to indicate whether the remaining rows for data include supplemental data, data in addition to rank data. In the example illustrated, extra message indicator plants X in rows 606 are assigned planting attributes corresponding to a binary encoding scheme value of zero when no supplemental data is present in the rank plants across the rows and are assigned planting attributes corresponding to a binary encoding scheme value of one when supplemental data is present in the rank plants across the rows.

When supplemental data is being presented, of the remaining seven rows for data (R), three rows 608 are reserved for encoding a type of the supplemental data being presented, seven rows 610 are reserved for encoding the actual supplemental data and rows 612A, 612B are reserved for encoding the rank of the plants across the rows. In the example illustrated, row 612B corresponds to the right most or first binary digit while row 612B corresponds to the second binary digit with the values of the remaining binary digits being inferred from the sequence. When supplemental data is not being presented, rows 608, 610 and 612 are reserved for encoding rank information. Encoding scheme 602 employs a policy in which any message appears in four consecutive ranks for enhanced data reliability. After the message is provided, no other message may be provided for at least four ranks.

FIG. 16 illustrates four ranks of a first pass in which no supplemental data is encoded into the planted plants. As a result, each of rows 608, 610, and 612A, 612B are utilized to encode a binary value identifying the current rank of the plants across rows. Controller 22 assigns the planting attributes of the plants in rows 606 so as to correspond to the binary encoding scheme value of zero indicating no supplemental data. Controller 22 assigns planting attributes to the plants in rows 608, 610, 612A and 612B such that the plants correspond to binary encoding scheme values form a sequence of bit values encoding the rank. Rank 1 is encoded by signing planting attributes to the plants in rows 608, 610, 612A and 612B to form the binary value of 000 0000000 0 1. Rank 2 is encoded by signing planting attributes to the plants in rows 608, 610, 612A and 612B to form the binary value of 000 0000000 1 0. Rank 3 is encoded by assigning planting attributes to the plants in rows 608, 610, 612A and 612B to form the binary value of 000 0000000 1 1. Rank 4 is encoded by signing planting attributes to the plants in rows 608, 610, 612A and 612B to form the binary value of 000 0000001 0 0 and so on.

FIG. 17 illustrates a portion of a ninth pass of a 16 row planting device or planter across the field 600 wherein some of the plant ranks across the rows are encoded with supplemental data. In the example illustrated, the ranks 1-4 are assigned planting attributes to encode the field pass number and ranks 9-12 are assigned planting attributes to encode a zone boundary identification. In the example illustrated, the plants in rows 606A and 606B of ranks 1-4 and 9-12 are assigned planting attributes corresponding to the binary encoding scheme value of 1 indicating that supplemental data is present. The plants in rows 608 of ranks 1-4 are assigned planting attributes corresponding to the binary encoding scheme values of 001 indicating that the supplemental data is a pass number (see FIG. 15). The plants in rows 608 of ranks 9-12 are assigned planting attributes corresponding to the binary encoding scheme values of 101 indicating that supplemental data is a management zone boundary (see FIG. 15). The plants in rows 610 of ranks 1-4 are assigned planting attributes corresponding to the binary encoding scheme values of 0001001 indicating that current pass number is assigned a value of 9. The plants in rows 610 of ranks 9-12 are assigned planting attributes corresponding to the binary encoding scheme values of 0001100 indicating that the boundary occurring at rank 9 or at another predetermined location is assigned a value of 12. The remaining plants in rows 612A and 612B are assigned planting attributes corresponding to the binary encoding scheme values of the least significant two digits of the sequence of bits representing the rank. The remaining digits of the sequence of bits representing the rank are inferred from the prior rank values and the sequencing of rows 612A and 612B.

In other implementations, other encoding schemes may be employed. In other implementations, one or more of clock plants C, extra message indicator plants X and data plants R may be omitted or may be differently apportioned amongst the available rows in a pass. For example, the controller 22 may employ different encoding scheme when plants are planted using an eight row planter.

FIG. 18 schematically illustrates data encoding system 720, an example implementation of data encoding systems 20 and 120. Data encoding system 720 comprises processor 800, memory 802, planting device 826, global navigation satellite system (GNSS) receiver 828, and wireless communication link 830. Processor 800 comprises one or more processing units configured to function as both encoder 121 and controller 22 as described above and in accordance with instructions or code stored in memory 802.

Memory 802 comprise a non-transitory computer-readable medium or persistent storage device comprising data store 832, equipment information 834 and encoding/planting module 836. Data store 832 comprise that portion of memory storing data 130 a (described above) to be encoded. In the example illustrated, data store 832 further stores as planted data and any data tables or lookup tables linking data to the encoding scheme values represented by the varying planting attributes.

Equipment information 834 comprises that portion of memory 802 storing data regarding planting device 826. In one implementation, such equipment information 834 is utilized to determine row information which can be inferred by processor 800 as an offset of the field pass relative to the direction of travel. In some implementations, equipment information 834 may be omitted.

Encoding and planting module 836 comprises instructions or code for directing processor 800 to encode data from data store 832 or from planting device 826 into patterns. Module 836 further directs processor 800 to generate control signals for planting device 826 so as to vary the attributes of plants to form the pattern of the encoded data in field 850. Module 836 contains instructions for directing processor 800 carry out the method described above with respect to FIGS. 2 and 4. Although illustrated as being carried by planting device 826, in other implementations, processor 800 and memory 802 are part of a distributed computing environment such as where processor 800 and/or memory 802 reside at one or more other locations, such as in a tractor other vehicle pulling the planting device 826, a remote office or worksite, other vehicles or anywhere accessible through wireless communications.

Planting device 826 comprises a device to physically position a plant in the ground or other growing medium or to output instructions to a person for manual placement of a plant in the ground or other growing medium. Planting device 826 is configured to selectively vary at least one planting attribute of an individual plant in response to control signals from processor 800 so as to form a pattern to encode the data. In the illustrated example, planting device 826 comprises a planter pulled by a tractor 858 and having row units 860a-860h (collectively referred to as row units 860) with electric drives 862a-862h (collectively referred to as electric drives 862), respectively, which vary the timing of seed singulation and/or seed placement. Electric drives 862 meter seed according to plant population, number of planter rows, rows spacing as well as planter ground speed. In the example illustrated, electric drives 862 further lead or lag seed placement relative to an explicit data clock provided by clock plants and described above or relative to an implicit data clock based upon planter ground speed to form a pattern of leading and lagging plant locations encoding data in field 850. To verify planting locations, row units 860 of planter 826 further comprise plant/seed sensors 864a-864h, respectively, which sense the actual planting locations of such seed/plants.

Although illustrated as an eight row planter capable of carrying out the encoding scheme set forth in FIGS. 10-13, in other implementations, planter 826 may have greater or fewer row units 860. For example, in another implementation, planter 826 comprises a 16 row planter having 16 row units 860, 16 electric drives 862 and 16 seed sensors 864 to the carry out the encodings scheme set forth and described above with respect to FIGS. 14-17. Although described as having electric drives the vary a longitudinal plant location attribute, lead/lag of a planted seed, planter 826 may alternatively comprise a twin row planter to vary a lateral plant location attribute such as described above with respect to FIG. 6. In still other implementations, planter 826 may comprise a planter configured to selectively plant different varieties of seed to facilitate varying plant characteristic attributes as described above with respect to FIG. 7. In yet other implementations, planter 826 may be configured to selectively vary two or more planting attributes.

GNNS receiver 828 is a satellite system receiver for identifying locations. Receiver 828 is in communication with processor 800. Although receiver 828 is illustrated as being carried by residing on planter 826, in other implementations, receiver 828 may reside on tractor 858 or may reside remote from field 850, such as at an off-site office, wherein informational data from receiver 828 are transmitted wirelessly to communications link 310. In some implementations, receiver 828 may be omitted.

Wireless communications link 830 comprises a communication device to send and receive information in a wireless fashion from processor 800 and remote sites. In one implementation, wireless communication link 830 is utilized to retrieve data to be encoded by encoding and planting module 836. In one implementation, link 830 is utilized to receive encoded information or planter control instructions where encoding and planting module 836 is not carried by planter 826 or where module 836 is remote from field 850. In some implementations, link 830 may be omitted.

In operation, data encoding system 720 encodes data in patterns of planting attributes of plants being planted field 850. In one implementation, planter location is geo-referenced and time referenced by processor 800 utilizing location signals received via receiver 828. As field name and year do not vary across the field, such data is geo-referenced and saved in data store 311. In some implementations, field name and year are also optionally encoded by varying planting attributes.

Signals from receiver 828 are utilized to detect distinct parallel passes of planter 826 across field 850 as well as at the head lands at each end of the field. In another implementation, such distinct passes across field 850 and at the head lands by planter 826 may be identified in other fashions such as through operator input or by sensor signals generated in response to planter 826 being raised and lowered. Each pass and its associated direction of travel are stored in data store 832 and may optionally encoded as data by varying planting attributes.

Row information is an offset to the pass relative to direction of travel. In one implementation, processor 800 infers row information using signals from receiver 828 and data from equipment information 834 indicating the number of row units of planting device 826. Such row information is also stored in data store 832 and may be optionally encoded as data by varying planting attributes.

Processor 800 determines rank information, which facilitates the identification of individual plants and phyto-referencing, using signals from planter 826 indicating when a pass is being started such as when planter 826 is engaged to start a pass. Once the pass is initiated, processor 800, following instructions provided by encoding and planting module 836, varies planting attributes to form a pattern encoding rank information as described above. In one implementation, processor 800 records as planted bit or plant patterns, as sensed by sensors 864, in data store 832 for use by other equipment in future operations such as cultivating, spraying and harvesting. Such stored bit or plant patterns may be used alone or in conjunction with other stored data to repeatedly and accurately identify a plant in field 850.

Figure 19:
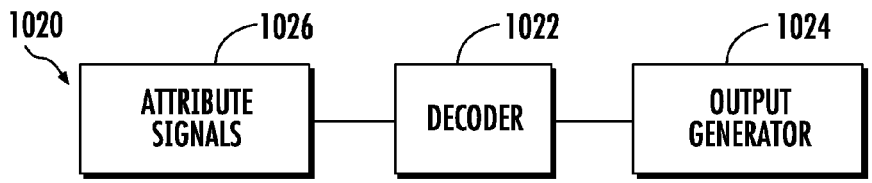
FIG. 19 is a schematic diagram of an example data decoding system.

FIG. 19 schematically illustrates an example data decoding system 1020. Data decoding system 1020 decodes data from previously intentionally encoded patterns of varying attributes of planted plants. In one implementation, data decoding system 1020 is configured to recover encoded data by detecting patterns of varying plant attributes produced by data encoding system 20, 120, 820. As will be described hereafter, data decoding system 1020 utilizes the retrieved data for phyto-referencing of individual plants and/or for triggering or signaling machine adjustments/stoppages.

Data decoding system 1020 comprises decoder 1022 and output generator 1024. Data decoder 1022 comprises one or more processing units to receive attribute signals 1026 representing sensed attributes of planted crops. Such signals indicate varying attributes of the plants. In one implementation where data is encoded by varying plant location attributes, as described above with respect to FIGS. 5 and 6, such signals indicate different locations of different plants. In another implementation where data is encoded by varying a plant characteristic attribute, as described above with respect to FIG. 7, such signals indicate the different color or other characteristics of the different plants. In yet other implementations where data is encoded using more than one attribute, such signals represent information for each of the multiple attributes.

Following instructions contained in a non-transitory computer-readable medium, decoder 1022 analyzes the attribute signals 1026 to identify one or more patterns or sequences in the varying attributes of the plants. Using a stored encoding scheme for such plants, decoder 1022 translates or identifies the patterns to recover the previously encoded data. In one implementation, such decoding or translation comprises identifying a numerical value represented by the encoding scheme. For example, the pattern 0011 in a binary coding scheme, as translated, means the 3. In one implementation, the numerical value constitutes the data itself such as the rank of an individual plant or the field pass number associated with an individual plant. In one implementation, the numerical value corresponds to a trigger for adjusting or disabling a machine. For example a determined value of 8888 may automatically trigger an adjustment or disabling of a machine. In one implementation, the numerical value corresponds to alphanumeric characters providing information. For example, different numerical values of different patterns may correspond to different alphanumeric characters such as under ASCII. In another implementation, the numerical value corresponds to a data field in a custom lookup table of data or information. In an example embodiment, the term "decode" comprises any of the aforementioned translation variations.

Output generator 1024 comprises a mechanism that responds to the recovered data from decoder 1022 to produce output. In a first mode of operation, output generator 1024 stores data in a non-volatile persistent storage medium. In one implementation, output generator 1024 associates and stores secondary data with the recovered data. For example, in one implementation, the recovered data is the rank of an individual plant. In one implementation, output generator 1024 associates secondary post planting data regarding the individual plant to the rank of the individual plant. Such secondary post planting data may comprise crop data and/or environmental data sensed or otherwise obtained after the plants have been planted or thinned with the pattern of varying attributes. Such secondary post planting data may be sensed or otherwise obtained one or more times, such as during the application of fertilizer, herbicide, insecticide and the like, such as during cultivation or other pre-harvesting inspection passes, and/or at the time of harvest. Examples of crop data include but are not limited to, stalk or stem width, plant height, plant population or density, plant color, inclusive of visible and non-visible wavelengths, plant health, plant disease or pest, ear, pod, bowl, fruit, berry or seed attributes. Examples of environmental data include, but are not limited to, soil type, soil texture, soil moisture, soil color, soil temperature, soil density or structure, current weather, rock attributes such as size and proximity to an identified plant, weed species, size and proximity to an identified plant, crop residue size and proximity to an identified plant and micro-landscape position. Micro-landscape position comprises the positioning of a plant stem relative to ridge, bed or furrow and the like.

In a second mode of operation, output generator 1024 may additionally or alternatively display information or prompts in response to the recovered information or data received from decoder 1022. In such implementations, the recovered data received from decoder 1022 serves as a trigger for outputting a notification, retrieving data or requesting data. For example, in response to receiving a predetermined numerical value derived from the sequence of varying attributes of plants, output generator 1024 may automatically display a warning, instruction or other notification to an operator. In one implementation, in response to receiving a predetermined numerical value derived from the sequence of varying attributes of plants, output generator 1024 may automatically retrieve associated data from a local or a remote database and display such retrieved data. In one implementation, in response to receiving a predetermined numerical value derived from the sequence of varying attributes of plants, output generator additionally or alternatively automatically displays a prompt or input request, requesting an operator to make a selection, enter data or personally change an operational characteristic of the machine that is interacting with the plants.

In a third mode of operation, output generator 1024 may additionally or alternatively automatically adjusts operation of a machine in response to the recovered data received from decoder 1022. For example, in one implementation, output generator 1024 may automatically lift an implement, such as a harvesting head or sprayer boom, in response to receiving recovered information indicating that the boundary of a head land or end row has been reached. In one implementation, output generator 1024 automatically adjusts the application of fertilizer, insecticide, herbicide or the like in response to receiving recovered information indicating a boundary of a different crop management region having a different soil type or a boundary of a different region of a different plant variety that may be less tolerant of a particular herbicide, insecticide or fertilizer.

Figure 20:
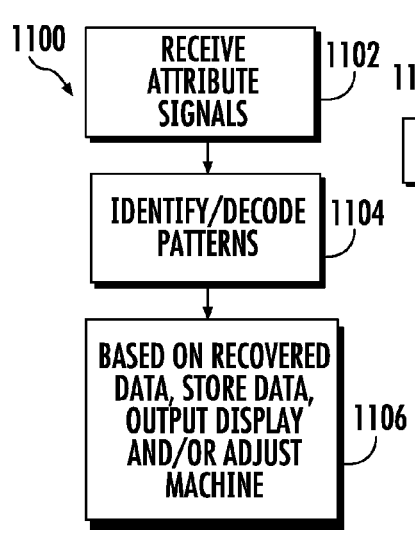
FIG. 20 is a flow diagram of an example method that may be carried out by the decoding system of FIG. 19.

FIG. 20 is a flow diagram of an example method 1100 which may be carried out by system 1020 of FIG. 19. As indicated by step 1102, decoder 1022 receives attribute signals. In one implementation, the attribute signals are received from one or more sensors local or remote with respect to decoder 1022. As indicated by step 1104, decoder 1022 decodes or identifies the one or more patterns of varying attributes of the plants such as plant location attributes or plant characteristic attributes to recover the data that was encoded. As indicated by step 1106, output generator 1024 receives the recovered data. Based on the recovered data, output generator 1024 stores data, outputs a display and/or adjusts a machine as described above with respect output generator 1024. Adjustment of the machine may comprise adjusting an operational characteristic of the machine or inhibiting operation of the machine.

Figure 21:
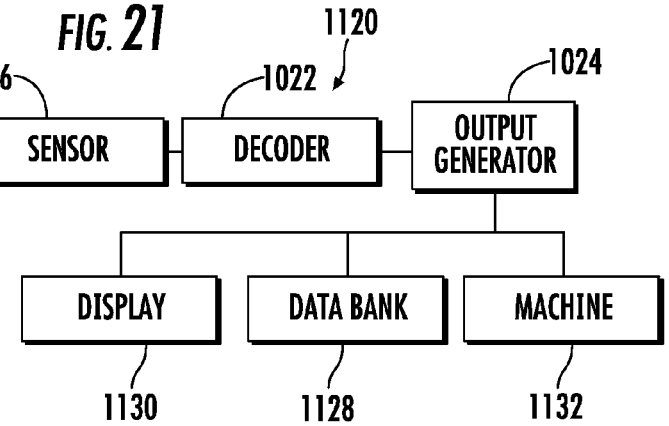
FIG. 21 is a schematic diagram of another example data decoding system.

FIG. 21 schematically illustrates data decoding system 1120, an example implementation of system 1020. System 1120 is similar to system 1020 except that system 1120 is illustrated as additionally comprising sensor 1126, databank 1128, display 1130 and machine 1132. Those remaining components of system 1120 which correspond to components of system 1020 are numbered similarly.

Sensor 1126 comprises a device to sense or detect attributes of planted plants such that decoder 1022 may identify any patterns of varying attributes. The configuration of sensor 1126 depends upon the attribute of the plant that is varied to encode data. In implementations where data is encoded by varying a plant location attribute, sensor 1126 comprises a camera with associated computer programming to discern individual plants and their locations, one or more switches or contact sensors configured to be tripped to produce a signal in response to contacting a plant, wherein different signals are produced in response to being contacted by a plant at different locations, and/or an optical sensor to detect plant presence and location. In implementations where data is encoded by varying a plant characteristic attribute, sensor 1126 comprises a camera with associated computer programming to discern individual plant characteristic such as plant color, shape, thickness and/or other plant characteristics.

Databank 1128, display 1130 and machine 1132 are each devices which are changed by output generator 1024 in response to recovered data provided by decoder 1022. Databank 1128 comprise a non-transitory computer-readable medium or persistent storage device in which output generator 1024 stores the recovered data or the secondary data (described above) with the recovered data or in an organization hierarchy based upon the recovered data. For example, in one implementation, output generator 1024 stores and records secondary data, such as individual plant yield, in order of plant rank, the recovered data.

Display 1130 presents information or prompts in response control signals received from output generator 1024 which are based upon recovered information from decoder 1022 as described above with respect to output generator 1024. In one implementation, display 1130 comprises a display monitor screen residing on the tractor, combine, truck or other infield vehicle or implement. In another implementation, display 1130 resides remote with respect to the field in which the encoded data is being recovered from the plants.

Machine 1132 comprises one or more devices or machines which interact with the plants, such as through vision, contact, material application and the like, based upon control signals from output generator 1024 or based upon recovered data from decoder 1022. Such machines comprise ground vehicle such as self-propelled vehicles or vehicles be pulled by a tractor, truck or other vehicle. Such machines comprise aerial vehicles, whether free flying or tethered, that fly above such plants. Examples of machine 1132, include, but not limited to, field inspection or observation vehicles, cultivators, sprayers, applicators and harvesters. In one implementation, machine 1132 carries sensor 1126.

Figure 22:
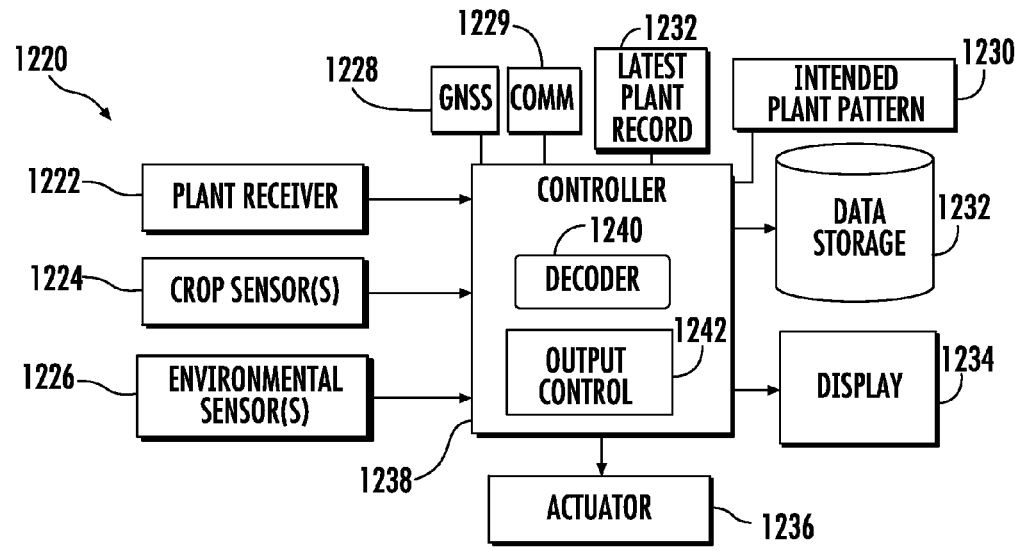
FIG. 22 is a schematic diagram of another example data decoding system.

FIG. 22 schematically illustrates decoding system 1220, another example implementation of decoding system 1120. Decoding system 1120 comprises plant perceiver 1222, crop sensor 1224, environmental sensor 1226, GNSS receiver 1228, wireless communications link 1229 intended plant pattern record 1230, latest plant record 1232, data storage 1232, display 1234, actuator 1236 and controller 1238. Plant perceiver 1222 is similar to a sensor 1126. Plant perceiver 1222 comprises one or more sensors that perceive or detect attributes of a plant such as a location of the plant and/or a characteristic of the plant. The configuration of perceiver 1222 depends upon the attribute of the plant that is varied to encode data and when data is being decoded. In one implementation, perceiver 1222 comprises a camera such as in instances where a characteristic of the plant is varied to encode data and/or when decoding is occurring independent of harvesting, leaving the plants in place. The camera may be carried by a ground vehicle or by an aerial vehicle. When plants are small, a mono camera or stereo camera may be employed. Color cameras may be utilized identify a color of the plant as well as to distinguish plants of interest apart from weeds, soil and crop residue. Such cameras may be sensitive in the near infrared and visible wavelengths. Such cameras or imaging systems may utilize ambient light or may include an additional light source. A camera may have a field of view which includes a single plant or a plurality of plants.

In one implementation, perceiver 1222 comprises a sensor to detect a location of the plant. In such an implementation, perceiver 1222 comprises a camera as described above. In yet other implementations, perceiver 1222 comprises other devices to detect relative positions of plants or relative distances. Examples of such sensors include, but are not limited to, time-of-flight/phase delay or light detection and ranging (LIDAR or LADAR), ultrasonic sensors, structured light or broken light beam sensors, and/or relative time triggering of mechanical feelers/contact sensors such as strain gauges, and/or accelerometers (where crop impact is sensed), and/or the like.

Crop sensor 1224 comprises one or more sensors that detect attributes of a plant distinct from those attributes that of been varied to encode data. Examples of such additional crop attributes that are detected by crop sensor 1224 include, but are not limited to, stalk or stem width, plant height, plant population density, plant color, plant health, plant disease or pest, ear, pod, boll, fruit, berry or seed attributes, yield or other plant characteristics. In one implementation, crop sensor 1224 detects such attributes of individual plants. In another implementation, crop sensor 1224 additionally or alternatively detects attributes of groups of plants or regions of a field. As will be described hereafter, such additional crop attribute information is associated with the individual plants to facilitate phyto-referencing.

Environmental sensor 1126 comprises one or more sensors to detect environmental characteristics or parameters in a field. In one implementation, environmental sensor 1126 resides on the same vehicle or implement as plant perceiver 1122. In other implementations, environmental sensor 1126 resides on a separate platform or vehicle, wherein environmental data are signals are transmitted to controller 1238 in a wireless fashion. Examples of environmental data collected by environmental sensor 1126 and transmitted to controller 1238 include, not limited to, soil type, soil texture, soil moisture, soil color, soil temperature, current weather, rock attributes such as size and proximity to an identified plant, weed species, size and proximity to identified plant, crop residue size and proximity to an identified plant, and micro-landscape positions.

GNSS system 1228 is a satellite system receiver for identifying locations. Receiver 1228 is in communication with controller 1228. In one implementation, receiver 1228 resides on an on ground vehicle or an area vehicle traveling over or across a field. GNSS data and a record of earlier field operations or a record of passes across the field are combined to provide plant identification information such as a field pass number. As a result, the pass number may be omitted from field encoding and alternatively be regenerated from a geo-position and a record of the prior field passes. In some implementations, receiver 1228 may be omitted.

Wireless communications link 1229 comprise a communication device to send and receive information in a wireless fashion between controller 1238 and remote sites. In one implementation, wireless communication link 1229 is utilized to retrieve data, such as environmental data or GNSS data, to be associated with individual plants for phyto-referencing. In one implementation, link 1229 is utilized to receive attributes from plant perceiver 1222 where controller 1238 is not local to perceiver 1222 or where controller 1238 is remote from the plants of the field being sensed by perceiver 1222. In some implementations, link 1229 may be omitted.

Intended plant pattern record 1230 comprises a record of the intended pattern of varying attributes. As noted above, during the planting, or subsequent thinning, data is encoded into varying attributes of the plants. The intended pattern generated by encoder 121 at such time is stored in a database, such as data storage 1232. In addition to identifying individual plants by their rank in a row or pass, such intended plant pattern may additionally include other information such as data, boundary marks and machine commands.

The latest plant record 1232 comprises a record of the actual or resulting pattern of varying attributes. During planting, seed sensors or plant sensors in a row unit seed path or in a monitoring location sense the location of the seed. The sensed location of the seed is used to generate a first version of the latest plant record 1232. Due to seed delays in a seed tube or seed bounce in the seed trench, actual seed/plant placement may not accurately encode the intended coding pattern 1230. Deviations between the intended plant pattern in the latest plant record are noted and a link is provided from the as planted latest plant record 1232 to the intended coding pattern 1230, allowing correction of the encoding error by mapping the corrupted encoding to the actual intended data.

Data storage 1232, similar to databank 1128, comprises a non-transitory computer-readable medium or persistent storage device to store the data recovered by controller 1238 as well as to store the phyto-referenced data such as crop data or environmental data associated with individual plants. Display 1234, similar to display 1130, presents information or prompts in response control signals received from controller 1238 which are based upon recovered encoded information. In one implementation, display 1234 comprises a display monitor screen residing on the tractor, combine, truck or other infield vehicle or implement. In another implementation, display 1234 resides remote with respect to the field in which the encoded data is being recovered from the plants.

Actuator 1236 comprises a mechanism that moves or adjusts a portion of machine to change interaction with the plants based upon control signals from controller 1238. In one implementation, actuator 1236 may comprise a hydraulic-pneumatic cylinder-piston assembly, an electric solenoid, and/or an engine or motor driven transmission that transit power, force or the like. For example, in one implementation, actuator 1236 comprises a hydraulic actuator for raising and lowering a sprayer boom or raising and lowering a combine head. In one implementation, actuator 1236 comprises an electric solenoid for opening and closing a valve to adjust, begin or stop the application of an insecticide, herbicide or fertilizer. In one implementation, actuator 1236 may comprise a hydraulic actuator that adjusts one or more harvesting characteristics of a combine such as throughput speed, drum and concave settings or thresher settings, cutter bar height, reel speed and the like.

Controller 1238 comprises one or more processing units and associated non-transitory computer readable mediums. Controller 1238 comprises decoder module 1240 and output control module 1242. Decoder module 1240 is similar to decoder 1022 described above. Output control module 1242 is similar to output generator 1024 described above. In the example illustrated, controller 1238 carries out the method set forth in FIG. 23.

Figure 23:
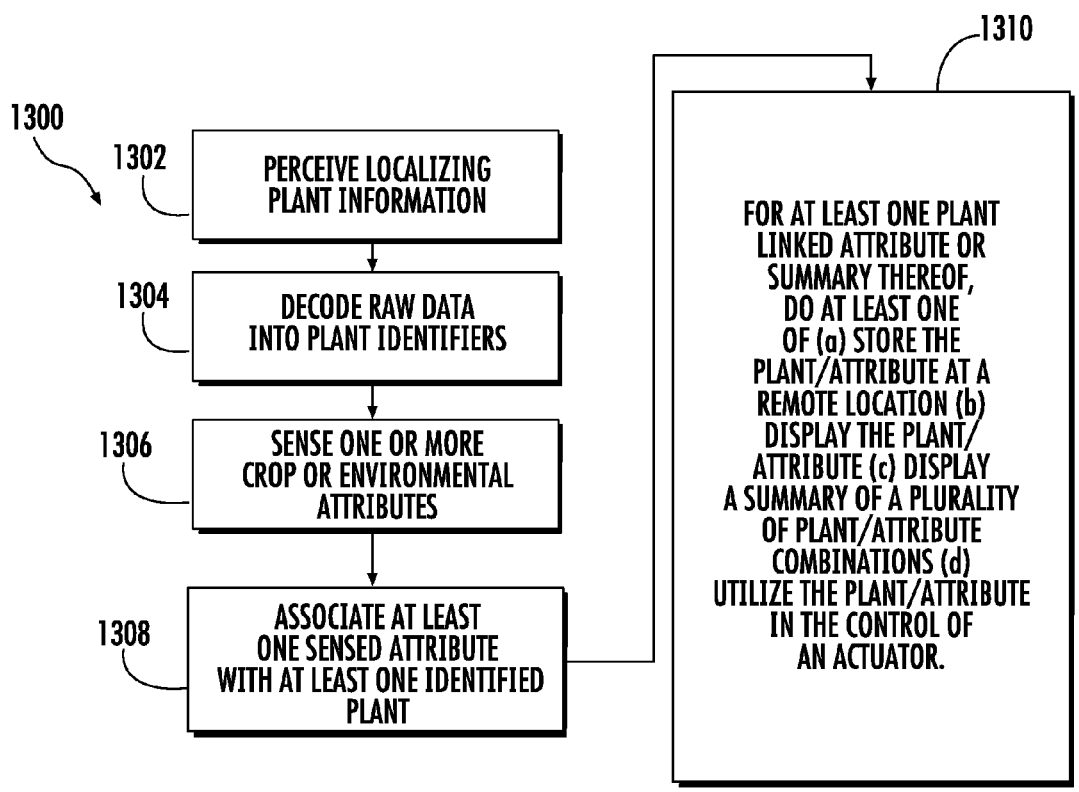
FIG. 23 is a flow diagram of an example method that may be carried out by the decoding system of FIG. 22.

FIG. 23 is a flow diagram illustrating an example method 1300 that may be carried out by decoder system 1220 of FIG. 22. As indicated by step 1302, plant perceiver 1222 perceives localize plant information. In one implementation, plant perceiver 1222 perceives plant location such as whether an individual plant is leading or trailing a longitudinal index location or is to the left or to the right of an lateral index location. In one implementation, plant perceiver 1222 perceives characteristics of the plant. Such raw data is transmitted to decoder module 1240 of controller 1238.

As indicated by step 1304, decoder module 1240 decodes the raw data into plant identifiers. For example, if the encoding scheme employed in a field and stored in data storage 1232 is the encoding scheme shown and described above with respect to FIGS. 16 and 17, a rank of plants across 16 rows having values of 0000 0000 0001 01C0 would indicate that the rank of such plants is rank number four, the fourth plant in each row of the particular field pass. As noted above, the field pass and the row of each plant may be derived from reference data from GNSS and equipment information or may be additionally encoded in the varying plant attributes. The result of such raw data decoding is that each plant is individually identified and distinguished for subsequent data associations or phyto-referencing.

As indicated by step 1306, crop sensors 1224 and environmental sensors 1126 sense one or more crop or environmental attributes as described above. The environmental attributes may be sensed concurrently with the sensing of crop data or may be independently sensed and transmitted to controller 1238.

As indicated by step 1308, output control 1242 associates at least one sensed attribute, crop or environmental, with at least one individual identified plant. The plant linked attributes are stored in data storage 1232 for subsequent analysis and use. As indicated by step 1310, for at least one of the plant linked attributes, output control module 1242 of controller 1238: (1) stores the plant and its linked attribute in a persistent storage device such as data storage 1232 at a location remote to controller 1238, such as data storage 1232, (2) displays the plant identification and its associated attribute on display 1234, (3) displays, on display 1234, a summary of a plurality of individual plants and their individual linked attributes and/or (4) utilizes the identified plants and their linked attributes in control of actuator 1236. In some implementations, output control module 1242 of system 1220 may additionally or alternatively display instructions, warnings, notifications or requests for input based upon recovered data provided by decoder module 1240.

As noted above, the intended plant pattern record 1230 and the latest plant record 1232 provide additional error correction above and beyond the use of parity error detection plants are bits. The table below illustrates a decoding example that uses the additional information to help compensate for missing plants and misreads. In the example illustrated, controller 1238 utilizes the latest plant record (LPR) 1232, the intended plant pattern record (IPP) 1230, and parity (P) for decoding plant data in an 8 rank by 4 row subsection of a field. In the example illustrated, each of rows 1, 2, and 3 implement a 3-bit Gray code for encoding the rank. The 4th row is a parity row. The reference X represents a plant which is missing because it did not emerge or had later died. Besides referencing data in the same rank across current data, LPR, and ICP, such decoding error correction is also useful for decoding preceding and following ranks. This is especially the case if a significant number of plants are missing in a small area due to a washout or equipment issue.

| Rank | IPP 123 P | LPR 123 P | Current Data 123 P | Comments |
|---|---|---|---|---|
| 1 | 000 0 | 000 0 | 000 0 | |
| 2 | 001 1 | 001 1 | 00X 1 | From parity, the ICP, and LPR, it can be determined that the plant has gone missing since the LPR was updated and the value it encoded was a 1. The LPR is updated to show a missing plant. |
| 3 | 011 0 | 0Y1 0 | 0Y0 0 | From the ICP and LPR, it can be determined that Y should be a 1 and that the plant went missing sometime between ICP and LPR. With a 1 substituted for Y, there is now a parity error in the rank and the 0 in row 3 should have been read as a 1. Depending on rules for updating the LPR, the row 3 plant could be left as a 1 since a plant was detected. Alternately it could be changed to a 0 since it was the last value read from that rank and row, especially considering that the plant preceding it in rank 2 is missing. |
| 4 | 010 1 | 010 1 | 010 1 | |
| 5 | 110 0 | 110 0 | 110 0 | |
| 6 | 111 1 | 111 1 | 111 1 | |
| 7 | 101 0 | 101 0 | 101 0 | |
| 8 | 100 1 | 100 1 | 100 1 | |

Figure 24:
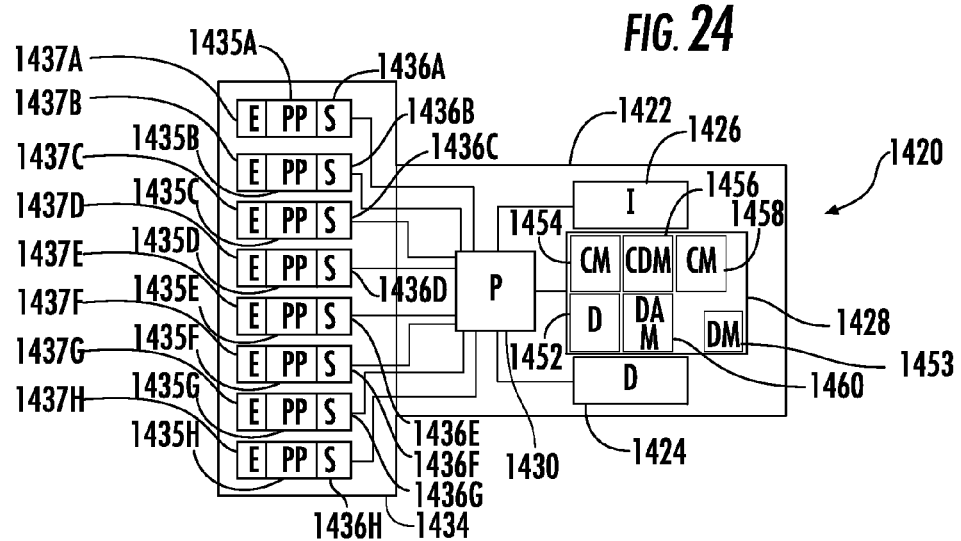
FIG. 24 is a schematic diagram of another example data decoding system.

FIG. 24 schematically illustrates decoding system 1420, an example implementation of decoding system 1220. Decoding system 1420 comprises an agricultural machine, an example of which is the illustrated harvester 1422. Crop sensing system 1420 further comprises display 1424, input 1426, processor 1430 and memory 1428. Harvester 1422 comprises a mobile machine configured to travel across a field or plot of land while harvesting a crop. Harvester 1422 comprises head 1434, plant perceivers 1435A-1435H (collectively referred to as plant perceivers 1435), crop sensors 1436A-1436H (collectively referred to as sensors 1436) and environmental sensors 1437A-1437H (collectively referred to as sensors 1437). In other implementations, decoding system 1420 may comprise other types of agricultural machines. Other examples of an agricultural machine are planters, cultivators, herbicide, insecticide or fertilizer applicators, cutters, mowers, pruners and/or the like.

Head 1434 comprises a mechanism configured to gather and harvest a crop along a swath. Head 1434 includes various mechanisms for harvesting, such as mechanisms to sever or separate the crop from a remainder of a plant. Such mechanisms may include knives or blades, stripper plates, rollers, snapping roles, augurs, gathering chains or belts and/or the like. In one implementation, head 1434 may comprise a corn head for a combine, wherein the corn head separates ears of corn from the remaining stalk. In another implementation, head 1434 may comprise a grain head for a combine, wherein the grain along with the stalk is severed and subsequently threshed by the combine. In other implementations, head 1434 may have other configurations. For example, although head 1434 is illustrated as being located at a forward end of harvester 1422 and as being interchangeable with other heads (facilitating the change of corn and grain heads), in other implementations, head 1434 may be supported at other locations by harvester 1422 and/or may be a permanent, non-interchangeable component of harvester 1422.

Plant perceivers 1435 are similar to plant perceivers 1222 described above. Each of plant perceivers 1435 is configured to detect varying attributes of individual plants to facilitate the identification of patterns and the decoding of encoded data in such patterns. The configuration of plant perceivers 1435 depends upon the attribute of the plant that is varied to encode data. In implementations where data is encoded by varying a plant location attribute, plant perceivers 1435 comprise one or more cameras with associated computer programming to discern individual plants and their locations, one or more switches or contact sensors configured to be tripped to produce a signal in response to contacting a plant, wherein different signals are produced in response to being contacted by a plant at different locations, an optical sensor to detect plant presence and location or other sensing devices. In implementations where data is encoded by varying a plant characteristic attribute, each of plant perceivers 1435 comprises a camera with associated computer programming to discern individual plant characteristic such as plant color, shape, thickness and/or other plant characteristics. Although each individual row unit of head 1434 is illustrated as including a dedicated plant perceiver 1435, in other implementations, multiple row units may alternatively share a plant perceiver that identifies varying attributes of individual plants in multiple row units.

Crop sensors 1436 comprise mechanisms to sense or detect one or more crop attribute values. Sensors 1436 detect one or more crop attribute values for the individual plants along the entire swath of head 1434 or a portion of swath or harvesting width of head 1434. In one example embodiment, sensors 1436 are located and carried by head 1434. Although each individual row unit of head 1434 is illustrated as including a dedicated crop sensor 1436, in other implementations, multiple row units may alternatively share a crop sensor 1436 that identifies varying attributes of individual plants in multiple row units. In other implementations, sensor 1436 may be provided at other locations. Sensors 1436 detect additional attributes of the individual plant such that crop attribute values pertaining to estimated mass of the grain or product of the individual plant, the estimated mass other than grain (MOG) of the plant and/or the like may be derived and linked to the identification of the plant.

In one implementation, each of sensors 1436 senses an interaction or impact force of grain upon a portion of the head 1434, such as a stripper plate of head 1434, wherein a mass of the grain may be derived based upon the sensed impact force and other sensed or known values. In another implementation, sensors 1436 detect a stalk thickness/diameter of an individual plant. The stalk thickness/diameter of the individual plant may be detected either through physical contact with individual plant or through laser or optical and camera-based sensors. The mass of the grain or the MOG may be derived from the sensed stalk thickness/diameter. Other examples of sensors 1436 include, but are not limited to, for example, light detection and ranging (LIDAR or LADAR), structured light or stereo camera vision, strain gauges, and/or accelerometers (where crop impact is sensed), and/or the like. The additional attributes detected by crop sensors 1436 is linked to the individual plants identified using decoded data from plant perceivers 1435.

Environmental sensors 1437 are similar to environmental sensors 1226 described above. Environmental sensors 1437 Environmental sensor 1126 comprise one or more sensors to detect environmental characteristics or parameters in a field. In the example illustrated, environmental sensors 1437 reside on the same vehicle or implement as plant perceiver 1435. In other implementations, environmental sensors 1437 reside on a separate platform or vehicle, wherein environmental data are signals are transmitted to processor in a wireless fashion. Examples of environmental data collected by environmental sensors 1435 and transmitted to processor 1430 include, not limited to, soil type, soil texture, soil moisture, soil color, soil temperature, current weather, rock attributes such as size and proximity to an identified plant, weed species, size and proximity to identified plant, crop residue size and proximity to an identified plant, and micro-landscape positions. In some implementations, one or more of sensors 1435, 1436 and 1437 may be combined are served by a single sensor which forms each of the noted functions.

Display 1424, similar to display 1234, comprises a device by which information may be visually presented to an operator of harvester 1422 or to a remotely located monitor/manager/operator of harvester 1422. Display 1424 may comprise a monitor or screen which is stationary in nature or which is mobile in nature. In one implementation, display 1424 is carried by harvester 1422 along with the operator. In another implementation, display 1424 comprises a stationary monitor remote from harvester 1422. In yet other implementations, display 1424 may be mobile in nature, being provided as part of a computer tablet, smart phone, personal data assistant (PDA) and/or the like.

Input 1426 comprises one or more devices by which controls and input may be provided to processor 1430. Examples of input 1426 include, but are not limited to, a keyboard, a touchpad, a touch screen, a steering wheel or steering control, a joystick, a microphone with associated speech recognition software and/or the like. Input 1426 facilitates the input of selections, commands or controls. In implementations where harvester 1422 is remotely controlled or remotely steered, input 1426 may facilitate such remote steering.

Memory 1428 comprises a non-transient computer-readable medium or persistent storage device for storing data for use by processor 1430 or generated by processor 30. In one implementation, memory 1428 may additionally store instructions in the form of code or software for processor 1430. The instructions may be loaded in a random access memory (RAM) for execution by processor 1430 from a read only memory (ROM), a mass storage device, or some other persistent storage. In other embodiments, hard wired circuitry may be used in place of or in combination with software instructions to implement the functions described. For example, at least regions of memory 1428 and processor 1430 may be embodied as part of one or more application-specific integrated circuits (ASICs). In one implementation, memory 1428 is carried by harvester 1422. In other implementations, memory 1428 may be provided remote from harvester 1422.

In the example illustrated, memory 1428 comprises data storage portion 1452, decoder module 1453, correlation module 1454, condition detection module 1456, display module 1458 and operations adjustment module 1460. Data storage portion 1452 comprises that portion of memory 1428 storing the memory encoding scheme employed by a data encoding system such as system 20, 120 or 720 described above. Data storage portion 1452 further stores the intended plant pattern record 1230 and the latest plant record 1232 described above. In one implementation, data storage portion 1452 further stores recovered and decoded data derived from the varying attribute values detected by plant perceivers 1435 and the individual plant linked data, including data produced by crop sensors 1436 and environmental sensors 1437. Such stored information may be in various formats such as tables, field maps and/or the like. Data storage portion 1452 may additionally store various settings and operator preferences.

Decoder module 1453, correlation module 1454, condition detection module 1456, display module 1458 and operations adjustment module 1460 comprise programming, software or code for directing the operation of processor 1430. Decoder module 1453 is similar to decoder module 1240 described above. Decoder module 1453 comprises one or more processing units to receive attribute signals, representing sensed attributes of planted crops, from plant perceivers 1435. Such signals indicate varying attributes of the plants. In one implementation where data is encoded by varying plant location attributes, as described above with respect to FIGS. 5 and 6, such signals indicate different locations of different plants. In another implementation where data is encoded by varying a plant characteristic attribute, as described above with respect to FIG. 7, such signals indicate the different color or other characteristics of the different plants. In yet other implementations where data is encoded using more than one attribute, such signals represent information for each of the multiple attributes.

Following instructions contained in a non-transitory computer-readable medium, decoder module 1453 analyzes the attribute signals to identify one or more patterns or sequences in the varying attributes of the plants. Using the encoding scheme for such plants stored in data storage 1452, decoder module 1453 translates or identifies the patterns to recover the previously encoded data. In one implementation, such decoding or translation comprises identifying a numerical value represented by the encoding scheme. For example, the pattern 0011 in a binary coding scheme, as translated, means the 3. In one implementation, the numerical value constitutes the data itself such as the rank of an individual plant or the field pass number associated with an individual plant. In one implementation, the numerical value corresponds to a trigger for adjusting or disabling a machine. For example a determined value of 8888 may automatically trigger an adjustment or disabling of a harvester 1422. In one implementation, the numerical value corresponds to alphanumeric characters providing information. For example, different numerical values of different patterns may correspond to different alphanumeric characters such as under ASCII. In another implementation, the numerical value corresponds to a data field in a custom lookup table of data or information.

Correlation module 1454 instructs processor 1430 in the correlation of one or more directly sensed crop attribute values detected by sensors 1436 to derived crop attribute values. In other words, correlation module 1454 instructs processor 1430 and the derivation of crop attribute values, such as yield and/or the like, from directly sensed crop attribute values. In one implementation, correlation module 1454 directs processor 30 to consult a lookup table in data storage portion 1452 to correlate a stalk thickness/diameter as detected by sensors 1436 to a grain mass or grain yield value, the derived crop attribute value. In another implementation, correlation module 1454 directs processor 1430 to carry out one or more algorithms/mathematical equations using a sensed impact of a plant or grain, and possibly using other additional factors, to derive a grain mass or yield of the plant. In other implementations, correlation module 1454 directs processor 1430 to derived crop attribute values from directly sensed crop attribute values in other fashions. Correlation module 1454 stores the derived crop attribute values and associates the derived crop attribute values in data storage 1452.

Condition detection module 1456 directs processor 1430 in the identification of field and/or crop conditions based upon the directly sensed crop attribute values or the derived crop attribute values. Examples of such field/crop conditions include, but are not limited to, the absence of plants, a field washout condition, an area of the field having yields suffering from wheel compaction beyond a predetermined threshold, the existence of a weed patch, the existence of yield loss due to inappropriate chemical application, and/or the like. In one implementation, condition detection module 1456 directs processor 1430 to consult a lookup table in data storage portion 1452 to correlate a stalk thickness/diameter as detected by sensors 1436 and/or a derived grain mass or grain yield value, the derived crop attribute value, to one of various predefined conditions, examples of which are set forth above. In another implementation, condition detection module 56 directs processor 1430 to carry out one or more algorithms and/or mathematical equations using a directly sensed crop attribute value and/or a derived crop attribute value and to further compare the resulting calculation to one or more predefined thresholds to identify a field and/or crop condition. In other implementations, condition detection module 1456 may direct processor 1430 to identify or detect crop and/or field conditions in other fashions. Such detected crop conditions may further be linked to the individual plants and stored in data storage 1452.

Display module 1458 instructs processor 1430 to generate control signals causing display 1424 to present various information and/or prompts to an operator based at least in part upon data decoded or recovered from the identified pattern or code of varying plant attributes. In such implementations, the recovered data received from decoder module 1453 serves as a trigger for outputting a notification, retrieving data or requesting data. For example, in response to receiving a predetermined numerical value derived from the sequence of varying attributes of plants, display module number 1458 may automatically display a warning, instruction or other notification to an operator. In one implementation, in response to receiving a predetermined numerical value derived from the sequence of varying attributes of plants, display module 1458 may automatically retrieve associated data from a local or a remote database and display such retrieved data. In one implementation, in response to receiving a predetermined numerical value derived from the sequence of varying attributes of plants, output generator additionally or alternatively automatically displays a prompt or input request, requesting an operator to make a selection, enter data or personally change and operational characteristic of the machine that is interacting with the plants through input 1426.

Operations adjustment module 1460 comprises code or programming which directs processor 1430 to automatically generate control signals adjusting operational parameters of harvester 1422 based at least in part upon data decoded or recovered from the identified pattern or code of varying plant attributes. In one implementation, operations adjustment module 1460 generates control signals raising or lowering head 1434 based upon the recovered data, such as when the recovered data indicates the boundary of a head land or end row. In one implementation, operations adjustment module 1460 independently adjusts operational parameters of distinct portions of head 1434. For example, in one implementation, operations adjustment module 1460 generates control signals for a hydraulic actuator that raises and lowers 1434. In one implementation, operations adjustment module 1460 may generate control signals for one or more actuators adjusting one or more other harvesting characteristics of harvester 1422 such as throughput speed, drum and concave settings or thresher settings and the like.

Processor 1430 comprises one or more processing units configured to carry out instructions either hardwired as part of an application-specific integrated circuit or provided as code or software stored in memory 1428. In the example illustrated, display 1424, input 1426, memory 1428 and processor 1430 are each illustrated as being part of and carried by harvester 1422. In other implementations, one or more of such components may alternatively be located remote from harvester 1422 and in communication with harvester 1422 in a wireless fashion. In some implementations, some of the aforementioned functions of processor 1430 and memory 1428 may be shared amongst multiple processors or processing units and multiple memories/databases, wherein at least some of the processors and memories/databases may be located remote with respect to harvester 1422.

Although the present disclosure has been described with reference to example embodiments, workers skilled in the art will recognize that changes may be made in form and detail without departing from the spirit and scope of the claimed subject matter. For example, not everything feature shown in drawings is required and one or more features may be omitted. Although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   an encoder to output encoded data based upon received data; and
   a controller configured to control a device to vary at least one attribute for each of a plurality of individual plants so as to form a pattern of attributes that encodes data for later recovery, wherein the at least one attribute is selected from a group of planting location attributes consisting of: longitudinal locations relative to a predetermined longitudinal index location; and lateral locations relative to a predetermined lateral index location.

2. The apparatus of claim 1, wherein the pattern comprises a binary scheme of the at least one planting attribute.

3. The apparatus of claim 1, wherein the pattern comprises an encoding scheme using at least two planting attributes to realize an encoding base greater than two.

4. The apparatus of claim 1, wherein the pattern comprises:
   a first pattern of a first attribute encoding a first data category for later recovery; and
   a second pattern of a second attribute encoding a second data category for later recovery.

5. An apparatus comprising:
   an encoder to output encoded data based upon received data; and
   a controller configured to control a device to vary at least one attribute for each of a plurality of individual plants so as to form a pattern of attributes that encodes data for later recovery, wherein the data comprises a rank of a plant in a sequence of parallel planted rows of the plants.

6. The apparatus of claim 5, wherein the data comprises supplemental data selected from a group of supplemental data consisting of: field name; crop year; field pass identification; row identification; a boundary identification and a machine adjustment trigger.

7. An apparatus comprising:
   an encoder to output encoded data based upon received data; and
   a controller configured to control a device to vary at least one attribute for each of a plurality of individual plants so as to form a pattern of attributes that encodes data for later recovery, wherein the data comprises a machine adjustment trigger.

8. The apparatus of claim 1 further comprising the device to selectively vary at least one attribute of an individual plant under control of the controller.

9. The apparatus of claim 1, wherein the controller is configured to control planting of plants by the device to vary the at least one attribute for each of a plurality of individual plants so as to form a pattern of attributes that encodes data for later recovery.

10. An apparatus comprising:
    an encoder to output encoded data based upon received data; and
    a controller configured to control a device to vary at least one attribute for each of a plurality of individual plants so as to form a pattern of attributes that encodes data for later recovery, wherein the controller is configured to control thinning of plants by the device to vary the at least one attribute for each of a plurality of individual plants so as to form a pattern of attributes that encodes data for later recovery.

11. A method comprising:
    planting a plurality of individual plants; and
    varying at least one attribute of each of the plurality of individual plants to encode data for later recovery, wherein the at least one attribute for each of a plurality of individual plants is varied during planting of the plants so as to form the pattern of attributes that encodes data for later recovery.

12. The method of claim 11, wherein the at least one attribute is selected from a group of planting attributes consisting of: a plant location attribute; a plant presence attribute; and a plant characteristic attribute.

13. The method of claim 11, wherein the at least one attribute is selected from a group of plant location attributes consisting of: longitudinal locations relative to a predetermined longitudinal index location; and lateral locations relative to a predetermined lateral index location.

14. The method of claim 11, wherein the at least one attribute is selected from a group of plant characteristic attributes consisting of: plant color, plant species, plant variety, plant height and plant shape.

15. The method of claim 11, wherein the pattern comprises a binary scheme of the at least one planting attribute.

16. The method of claim 11, wherein the pattern comprises an encoding scheme using at least two planting attributes to realize an encoding base greater than two.

17. The method of claim 11, wherein the pattern comprises:
    a first pattern of a first attribute encoding a first data category for later recovery; and
    a second pattern of a second attribute encoding a second data category for later recovery.

18. The method of claim 11, wherein the data comprises a rank of a plant in a sequence of parallel planted rows of the plants.

19. The method of claim 11, wherein the data comprises a rank of a plant in a sequence of parallel planted rows of the plants and supplemental data selected from a group of supplemental data consisting of: field name; crop year; field pass identification; row identification; a boundary identification and a machine adjustment trigger.

20. The method of claim 11, wherein the data comprises a machine adjustment trigger.

21. The method of claim 11 further comprising the planting device to selectively vary at least one attribute of an individual plant under control of the controller.

* * * * *